United States Patent
Mästle et al.

(10) Patent No.: US 12,188,859 B2
(45) Date of Patent: Jan. 7, 2025

(54) APPARATUS COMPRISING AT LEAST ONE THz DEVICE AND METHOD OF OPERATING SUCH APPARATUS

(71) Applicant: HELMUT FISCHER GMBH INSTITUT FÜR ELEKTRONIK UND MESSTECHNIK, Sindelfingen (DE)

(72) Inventors: Rüdiger Mästle, Böblingen (DE); Henry Thiele, Grafenau (DE); Andreas Godorr, Maulbronn (DE)

(73) Assignee: HELMUT FISCHER GMBH INSTITUT FÜR ELEKRONIK UND MESSTECHNIK, Sindelfingen (DE)

( * ) Notice: Subject to any disclaimer, the term of this patent is extended or adjusted under 35 U.S.C. 154(b) by 687 days.

(21) Appl. No.: 17/428,940

(22) PCT Filed: Jul. 17, 2020

(86) PCT No.: PCT/EP2020/070382
§ 371 (c)(1),
(2) Date: Aug. 5, 2021

(87) PCT Pub. No.: WO2021/013766
PCT Pub. Date: Jan. 28, 2021

(65) Prior Publication Data
US 2022/0120667 A1    Apr. 21, 2022

(30) Foreign Application Priority Data
Jul. 19, 2019 (EP) .................... 19187325

(51) Int. Cl.
*G01N 21/15* (2006.01)
*G01N 21/3581* (2014.01)
(Continued)

(52) U.S. Cl.
CPC ......... *G01N 21/15* (2013.01); *G01N 21/3581* (2013.01); *G01B 11/0616* (2013.01); *G01N 2021/151* (2013.01); *G01N 21/8806* (2013.01)

(58) Field of Classification Search
CPC ............... G01N 21/15; G01N 21/3581; G01N 21/8806; G01N 2021/151; G01N 21/01;
(Continued)

(56) References Cited

U.S. PATENT DOCUMENTS

| 4,826,084 A | 5/1989 | Wallace |
| 7,420,681 B1 | 9/2008 | Wang et al. |

(Continued)

FOREIGN PATENT DOCUMENTS

| CN | 201862351 U | 6/2011 |
| CN | 207096101 U | 3/2018 |

(Continued)

OTHER PUBLICATIONS

PCT/EP2020/070382. Int'l Search Report & Written Opinion (Sep. 30, 2020).

(Continued)

*Primary Examiner* — Abdullahi Nur
(74) *Attorney, Agent, or Firm* — Jessica Smith; LOZA & LOZA, LLP

(57) ABSTRACT

An apparatus includes at least one Terahertz (THz) device that transmits or receives THz radiation or transmits and receives THz radiation. The apparatus also provides a flow of protective gas in at least one portion of the beam path of the THz radiation.

32 Claims, 11 Drawing Sheets

(51) Int. Cl.
*G01B 11/06* (2006.01)
*G01N 21/88* (2006.01)

(58) Field of Classification Search
CPC ..... G01B 11/0616; G01S 7/484; G01S 7/486; H01S 1/02
See application file for complete search history.

(56) References Cited

U.S. PATENT DOCUMENTS

| | | |
|---|---|---|
| 2008/0257976 A1 | 10/2008 | Danzer |
| 2012/0190997 A1* | 7/2012 | Varga ................... G01N 21/031 250/343 |
| 2012/0225418 A1 | 9/2012 | Meyer et al. |
| 2015/0268030 A1 | 9/2015 | White et al. |

FOREIGN PATENT DOCUMENTS

| | | |
|---|---|---|
| DE | 4240190 A1 | 6/1994 |
| DE | 10065825 A1 | 7/2002 |
| EP | 0600249 A1 | 6/1994 |
| EP | 1469298 A1 | 10/2004 |
| WO | 2012167907 A1 | 12/2012 |
| WO | 2018029432 A1 | 2/2018 |

OTHER PUBLICATIONS

European Appln. Ser. No. 19187325.6. Extended Search Report (Jan. 8, 2020).
Corresponding Chinese Appln. No. 202080011660.3 Office Action (Apr. 26, 2024).

* cited by examiner

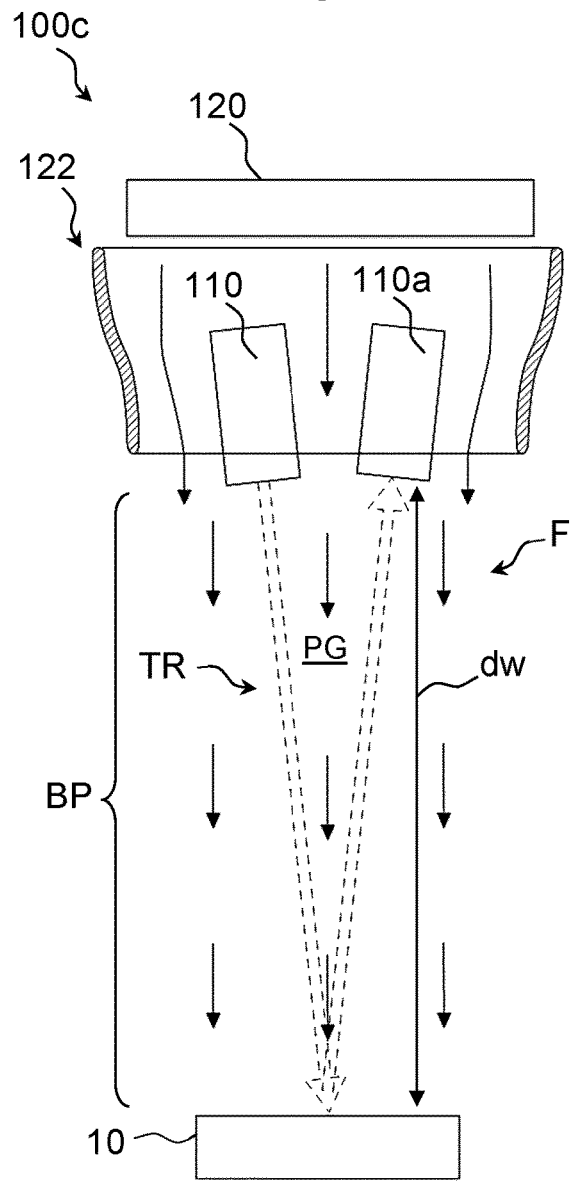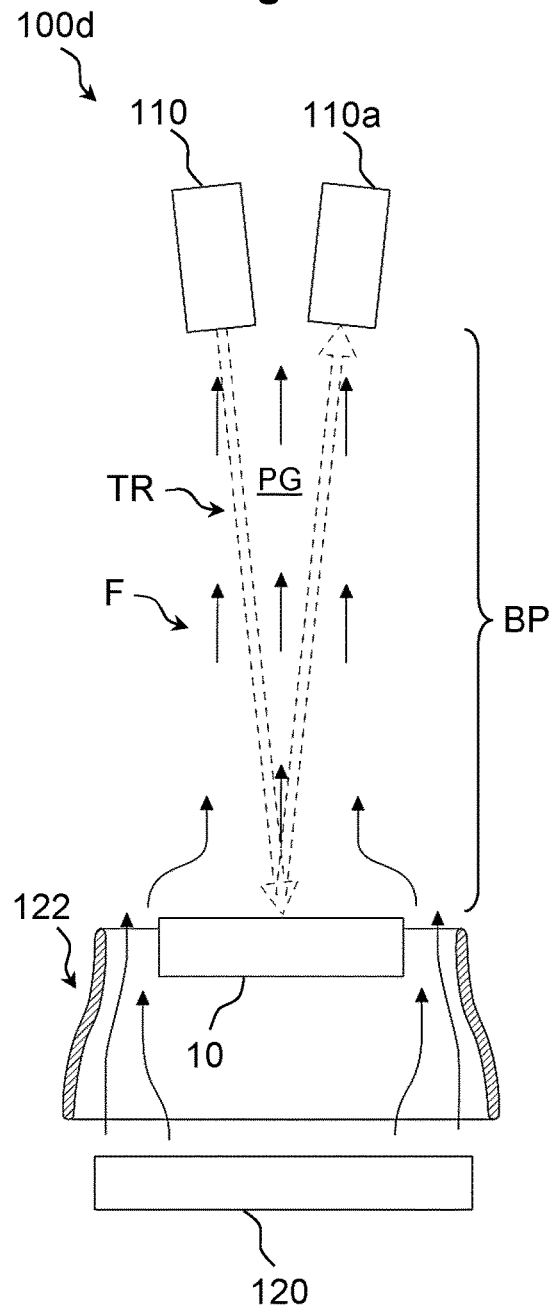

APPARATUS COMPRISING AT LEAST ONE THz DEVICE AND METHOD OF OPERATING SUCH APPARATUS

CROSS REFERENCE TO RELATED APPLICATIONS

The present application claims priority as a national stage application under 35 U.S.C. 371 to PCT Application No. PCT/EP2020/070382 filed on Jul. 17, 2020, entitled, "Apparatus comprising at least one THz Device and Method of Operating such Apparatus," which claims priority to EP Application No. 19187325.6 filed on Jul. 19, 2019, entitled "Apparatus comprising at least one THz Device and Method of Operating such Apparatus," both of which are incorporated by reference herein.

FIELD

The disclosure relates to an apparatus comprising at least one Terahertz (THz) device configured to transmit and/or receive THz radiation and to a method of operating an apparatus comprising at least one Terahertz (THz) device configured to transmit and/or receive THz radiation.

SUMMARY

Embodiments described herein relate to an apparatus comprising at least one THz device configured to transmit and/or receive THz radiation, said apparatus being configured to provide a flow of protective gas in at least one portion of a beam path of said THz radiation. This advantageously enables to control the local environmental conditions that may affect propagation of said THz radiation thus enabling an increased precision for measurements using said THz radiation.

According to further embodiments, said at least one THz device comprises at least one of: a) a THz transmitter configured to transmit THz radiation, b) a THz receiver configured to receive THz radiation, c) a THz transceiver configured to transmit and to receive THz radiation. According to further embodiments, more than one THz transmitter and/or more than one THz receiver and/or more than one THz transceiver may also be provided.

According to further embodiments said THz radiation comprises at least one frequency component in the range of 0.3 THz and 100 THz, preferably in the range of 0.5 THz and 10 THz, more preferably in the range of 3.0 THz to 10 THz.

According to further embodiments, said protective gas comprises, or preferably is, at least one of: a) dry air, b) dry gas, c) dry gas mixture.

According to further embodiments, said protective gas comprises at least one gas which does not comprise an absorption line in a frequency range of said THz radiation.

According to further embodiments, said protective gas effects an attenuation of said THz radiation along said beam path of 0.1 dB or less, preferably for any frequency of said THz radiation.

According to further embodiments, said protective gas comprises a dew-point temperature of −20 degrees Celsius (° C.) or less, preferably of −30° C. or less, further preferably of −40° C. or less.

According to further embodiments, said apparatus further comprises at least one protective gas supply device configured to provide said flow of protective gas.

According to further embodiments, said apparatus comprises at least one pressure controller for influencing, particularly controlling, a pressure of said flow of protective gas. According to further embodiments, said influencing, particularly controlling, said pressure of said flow of protective gas may comprise an open-loop or a closed-loop control. According to further embodiments, reference measurements using said THz radiation may be made, and at least one parameter characterizing fluid flow properties of a region of said beam path of said THz radiation may be determined. Based on said at least one parameter, e.g. the pressure of said flow of protective gas may be controlled in a closed-loop control. This way, the pressure of said flow of protective gas may be optimized regarding a precision of said THz measurements, e.g. attaining a laminar or even homogenous flow of said protective gas in at least a portion of said beam path of said THz radiation.

According to further embodiments, said apparatus comprises at least one flow regulator for influencing, particularly controlling, a volume flow of said (flow of) protective gas. According to further embodiments, said influencing, particularly controlling, said volume flow of said flow of protective gas may comprise an open-loop or a closed-loop control. According to further embodiments, reference measurements using said THz radiation may be made, and at least one parameter characterizing fluid flow properties of a region of said beam path of said THz radiation may be determined. Based on said at least one parameter, e.g. the volume flow of said protective gas may be controlled in a closed-loop control. This way, the volume flow of said flow of protective gas may be optimized regarding a precision of said THz measurements, e.g. attaining a laminar or even homogenous flow of said protective gas in at least a portion of said beam path of said THz radiation.

According to further embodiments, said (optional) pressure controller may also form part of the protective gas supply device and/or may be connected in series thereto, e.g. to an output (or, according to further embodiments, to an input) of said protective gas supply device.

According to further embodiments, said apparatus further comprises at least one nozzle, wherein preferably said at least one nozzle is configured and/or arranged so as to direct said flow of protective gas, or at least a portion of said flow, to said at least one portion of said beam path of said THz radiation, wherein preferably said at least one nozzle is a free jet nozzle. This enables to provide the region comprising said beam path of said THz radiation with a precisely controllable flow of protective gas. According to further embodiments, said flow may comprise a laminar flow, preferably a homogenous flow. According to further embodiments, said at least one nozzle may form part of said at least one protective gas supply device.

According to further embodiments, said at least one nozzle is arranged parallel with respect to said beam path of said THz radiation or a reference axis of said at least one THz device. In other words, according to further embodiments, a reference axis of said nozzle along which the protective gas is output by said nozzle may be parallel with respect to said beam path of said THz radiation or a reference axis of said at least one THz device.

According to further embodiments, said at least one nozzle is arranged coaxially with respect to said beam path of said THz radiation or a reference axis of said at least one THz device, preferably such that said nozzle coaxially surrounds said beam path of said THz radiation. This enables to precisely "embed" said THz radiation in the flow of protective gas as provided by said at least one nozzle, thus further reducing adverse effects on said THz radiation due to undesired absorption by a surrounding fluid (e.g., atmospheric air) and/or inhomogeneities of a flow velocity and/or a turbulent flow, e.g. in radially outer regions of said flow of protective gas, thus further increasing precision.

According to further embodiments, said at least one nozzle (e.g., a reference axis of said at least one nozzle) is arranged at an acute angle with respect to said beam path of said THz radiation or a reference axis of said at least one THz device, wherein preferably said acute angle ranges between 0 degrees and 30 degrees, preferably between 0 and 20 degrees.

According to further embodiments, said apparatus further comprises an inlet port for receiving protective gas from an external supply. According to further embodiments, said inlet port may form part of said at least one protective gas supply device According to further embodiments, said apparatus further comprises a, preferably local, supply for said protective gas, wherein said, preferably local, supply is preferably attached to and/or integrated into at least one other component of said apparatus. According to further embodiments, said, preferably local, supply may form part of said at least one protective gas supply device.

According to further embodiments, said external supply and/or said, preferably local, supply comprises at least one of: a) a protective gas tank for at least temporarily storing said protective gas, b) a protective gas generator configured to generate said protective gas, wherein preferably said protective gas generator is configured to receive atmospheric air and to convert said atmospheric air into said protective gas, preferably into dry air.

According to further embodiments, said apparatus is configured to provide one or more gas jets of said protective gas, wherein preferably said one or more gas jets contribute to or constitute said flow. According to further embodiments, at least one nozzle may be provided, wherein said at least one nozzle may be configured to provide said one or more gas jets of said protective gas According to further embodiments, said flow and/or at least one of said gas jets comprises and/or is a free jet. This enables particularly large nominal working distances for said apparatus, because the THz radiation may efficiently be "shielded" from atmospheric air (and/or other surrounding fluids that may affect a propagation of THz radiation) by said free jet(s) of protective gas. Particularly, this way, no housing or any other solid body or device for guiding said flow and/or gas jets (apart from e.g. the nozzle) is required to be placed between the apparatus and a measuring object that interacts with said THz radiation. According to further embodiments, a potential core length of said free jet is equal to or larger than about 2 cm in some embodiments or 4 cm in some embodiments According to further embodiments, said flow and/or said at least one of said gas jets comprises a direction a) parallel to said beam path of said THz radiation (e.g., besides said beam path of said THz radiation or axially surrounding said beam path of said THz radiation) or b) at least substantially parallel to said beam path of said THz radiation, e.g. including a nonvanishing acute angle with said beam path of said THz radiation, wherein said nonvanishing acute angle is preferably less than 20 degrees, more preferably less than 10 degrees.

According to further embodiments, a nominal working distance between said at least one THz device and a measuring object interacting with said THz radiation transmitted from and/or received by said at least one THz device is equal to or greater than 4 centimeter (cm) in some embodiments and equal to or greater than 10 cm in some embodiments.

Advantageously, no device for guiding a flow of said protective gas or any other device is required to be arranged between said apparatus and said measuring object, as the flow of protective gas, preferably comprising one or more free jets, is sufficient for establishing a controlled local atmosphere of protective gas in the region of the beam path of the THz radiation. This facilitates handling, as e.g. no housing or the like is required between the apparatus and the measuring object. Particularly, when using the principle according to embodiments, and in contrast to conventional approaches, the measuring object is not required to be placed within an own housing for THz measurements. Rather, the protective gas flow, preferably free jet, according to embodiments may be considered to shield the THz beam path from adverse environmental effects such as humidity that may cause undesired absorption of THz radiation which would reduce measurement precision.

According to further embodiments, said apparatus comprises a first nozzle (e.g., a free jet nozzle), which is configured to provide a first jet, preferably a free jet, of said protective gas, preferably to said at least one portion of said beam path of said THz radiation, and wherein said apparatus further comprises a second nozzle, which is a ring nozzle arranged coaxially around said first nozzle, wherein preferably said second nozzle is configured to provide a second jet, which preferably, particularly at least partly, coaxially surrounds said first jet, wherein preferably said second jet is a sheath flow. Advantageously, said sheath flow may extend radially outside of said first jet, e.g. free jet, provided by said first nozzle, thus protecting said first jet, e.g. free jet, provided by said first nozzle from interaction with the surrounding medium, e.g. fluid, such as atmospheric air. Moreover, the sheath flow prevents the creation of turbulent flows at a radially outer section of said first jet, e.g. free jet, provided by said first nozzle. Rather, at first, turbulent flows may occur at an interface between a radially outer side of said sheath flow and the surrounding medium, which does not affect the THz beam path lying inside the first jet. Only after the sheath flow is dissipated, e.g. due to creation of turbulent flows at the interface between the radially outer side of said sheath flow and the surrounding medium, turbulent flows may occur at a radially outer side of the inner first jet. This configuration enables to further increase the nominal wording distance between said at least one THz device and a measuring object, as the radially outer sheath flow effectively protects the radially inner first jet, e.g. free jet.

According to further embodiments, said second jet (i.e., the sheath flow), may comprise ambient air or said protective gas. As the fluid of the (radially outer) second jet usually does not (or at least not substantially) interact with the, preferably radially inner, THz beam path, the second jet may comprise ambient air. However, for further increasing precision and a nominal working distance, according to further embodiments, said protective gas may also be used for said second jet, i.e. the sheath flow.

According to further embodiments, said apparatus comprises a housing, wherein said at least one THz device is arranged in an interior of said housing, wherein preferably also at least one component of said protective gas supply device is arranged within and/or constituted by said interior of said housing.

According to further embodiments, said inlet port is arranged at and/or integrated into said housing, wherein said at least one nozzle is arranged at and/or integrated into said housing, and wherein a fluid communication between said inlet port and said at least one nozzle is enabled via an interior of the housing. In other words, at least a part of the housing of the apparatus operates as a conduit for guiding said protective gas from the inlet port to said at least one nozzle. This has the further advantage that said one or more THz devices arranged within said housing are also at least partly surrounded with said protective gas.

According to further embodiments, the inlet port may also be arranged close to or directly at said nozzle, to directly supply said nozzle with said protective gas.

According to further embodiments, said housing comprises an opening for passing through said THz radiation, wherein said at least one nozzle is arranged in and/or at and/or around said opening.

According to further embodiments, said housing comprises an opening for passing through said THz radiation, wherein said at least one nozzle forms said opening. In other words, according to some embodiments, said at least one nozzle may comprise an opening for providing said flow of protective gas to e.g. the exterior of the housing, particularly to a region of said beam path of said THz radiation, wherein said opening of said nozzle at the same time operates as a window enabling said THz radiation to be transmitted from the interior of the housing to an exterior of the housing, e.g. towards a measuring object and/or vice versa, e.g. to enable a THz receiver or transceiver arranged within said housing to receive THz radiation from the exterior of the housing. In other words, according to some embodiments, said at least one nozzle may comprise a first, fluidic, function to provide said flow of protective gas, and additionally a second function to operate as a window enabling transmission and/or reception of said THz radiation.

According to further embodiments, said apparatus comprises at least one lid for, particularly selectively, opening and/or closing, preferably sealingly, particularly hermetically (gastight) sealingly, closing, said opening, wherein preferably said lid is, particularly rotatably, attached to at least one of: the housing, the nozzle. According to further embodiments, the opening and/or closing may e.g. be performed depending on an operational state of said apparatus. E.g., for an activated state, e.g. usable form performing measurements using said THz radiation, said lid may—at least temporarily—be opened, and for a deactivated state, said lid may be closed.

According to further embodiments, an actuator may be provided to drive movement of said lid, i.e. for opening said lid and/or closing said lid. In the closed state, the lid prevents e.g. particles to enter the interior of the housing, while in the opened state, the lid enables transmission and/or reception of THz radiation, as well as e.g. (optionally) a flow of protective gas through said opening. If, according to further embodiments, a flow of protective gas is provided through said opening in the opened state of the lid, particles are prevented from entering the interior of the housing by means of said protective gas flow.

According to further embodiments, a window is provided in said opening, wherein said window is preferably sealingly, particularly hermetically (gastight) sealingly, covering and/or closing said opening, wherein said window is transparent (i.e., comprises a predetermined maximum attenuation) to said THz radiation in order not to impede THz measurements. According to further embodiments, said at least one nozzle may be provided around said opening having said window, e.g. being attached to an outer surface of the housing, and said at least one nozzle may comprise an inlet port for receiving the protective gas. Particularly, in these embodiments, the inlet port is outside the housing of the apparatus (in which e.g. said at least one THz device may be arranged), so that the interior of the housing is not provided with "fresh" protective gas when said at least one nozzle is supplied with said protective gas to provide said flow of protective gas to the beam path of the THz radiation. According to further embodiments, the housing may be hermetically sealed, and the interior may be filled with protective gas prior to sealing, e.g. during manufacturing of said housing.

According to further embodiments, said apparatus further comprises a positioning system, particularly a robot. As an example, according to further embodiments, the housing may comprise one or more THz devices as explained above, thus forming a THz measuring head, which THz measuring head may be attached to said robot, so that THz measurements may efficiently be made for a wide variety of measuring objects. As an example, the apparatus and/or the THz measuring head may be used for THz measurements in in-line configurations of a manufacturing plant.

Further embodiments relate to a measuring system comprising at least one apparatus according to the embodiments and at least one measuring object, wherein preferably said apparatus and said at least one measuring object are spaced apart from each other by a measuring distance of at least 2 centimeters, preferably of at least 5 centimeters, wherein preferably a spatial region between said apparatus and said measuring object is exposed to the surroundings (i.e. not covered by a housing or the like), wherein preferably no body, preferably no solid body, (or any other material apart from said flow of protective gas (and/or an optional sheath flow)) is arranged between said apparatus and said measuring object.

Further embodiments relate to a method of operating an apparatus comprising at least one THz device, wherein said at least one THz device is configured to transmit and/or receive THz radiation, wherein said apparatus provides a flow of protective gas in at least one portion of a beam path of said THz radiation.

According to further embodiments, said apparatus further comprises at least one nozzle, wherein preferably said at least one nozzle directs said flow of protective gas, or at least a portion of said flow, to said at least one portion of said beam path of said THz radiation, wherein preferably said at least one nozzle is a free jet nozzle.

According to further embodiments, said apparatus further comprises an inlet port for protective gas, and said apparatus receives said protective gas via said inlet port from an external supply.

According to further embodiments, said apparatus comprises a, preferably local, supply for said protective gas, wherein said supply is preferably attached to and/or integrated to at least one other component of said apparatus, and supplies e.g. said at least one nozzle with said protective gas from said preferably local supply.

According to further embodiments, said apparatus provides one or more gas jets of said protective gas, wherein preferably said one or more gas jets contribute to or constitute said flow, wherein preferably said flow and/or at least one of said gas jets comprises and/or is a free jet.

According to further embodiments, said apparatus provides said flow and/or said at least one of said gas jets comprises a direction a) parallel to said beam path of said THz radiation or b) at least substantially parallel to said beam path of said THz radiation.

According to further embodiments, said apparatus performs measurements using said THz radiation using a nominal working distance between said at least one THz device and a measuring object interacting with said THz radiation transmitted from and/or received by said at least one THz device equal to or greater than, e.g., 4 centimeter (cm) in some examples and in some other examples, equal to or greater than 10 cm.

According to further embodiments, said apparatus comprises a first nozzle and provides, by means of said first nozzle, a first jet, preferably a free jet, of said protective gas, preferably to said at least one portion of said beam path of said THz radiation, wherein said apparatus further comprises a second nozzle, which is a ring nozzle arranged coaxially around said first nozzle, wherein preferably said apparatus provides a second jet by means of said second nozzle, which preferably, particularly at least partly, coaxially surrounds said first jet, wherein preferably said second jet is a sheath flow.

According to further embodiments, said apparatus comprises a housing, wherein said at least one THz device is arranged in an interior of said housing, wherein preferably also at least one component of said protective gas supply device is arranged within and/or constituted by said interior of said housing. According to further embodiments, said inlet port is arranged at and/or integrated into said housing, wherein said at least one nozzle is arranged at and/or integrated into said housing, and wherein an interior of said housing enables a fluid communication between said inlet port and said at least one nozzle. According to further embodiments, two or more nozzles may be provided (e.g., a first nozzle providing a radially inner free jet and a second nozzle providing a radially outer sheath flow coaxially surrounding said radially inner free jet), wherein said interior of said housing enables a fluid communication between said inlet port and said first nozzle and said second nozzle.

According to further embodiments, said housing comprises an opening for passing through said THz radiation, wherein a) said at least one nozzle is arranged in and/or at and/or around said opening and/or b) forms said opening. According to further embodiments, said apparatus comprises at least one lid and, particularly selectively, opens and/or closes, preferably sealingly, particularly hermetically sealingly, closes, said opening, wherein preferably said lid is, particularly rotatably, attached to at least one of: the housing, the nozzle.

Apparatus according to at least one of the preceding claims, further comprising a positioning system, particularly a robot, wherein said positioning system positions said at least one THz device and/or said housing, particularly relative to a measuring object.

Further embodiments relate to a method of operating a measuring system comprising at least one apparatus according to at least one of the preceding claims and at least one measuring object, wherein preferably said apparatus and said at least one measuring object are spaced apart from each other by a measuring distance of at least 2 centimeters, preferably of at least 5 centimeters, wherein preferably no body, preferably no solid body, is arranged between said apparatus and said measuring object.

Further embodiments relate to a computer program comprising instructions which, when the program is executed by a computer, cause the computer to carry out the method according to according to the embodiments.

Further embodiments relate to a computer-readable storage medium comprising instructions which, when executed by a computer, cause the computer to carry out the method according to the embodiments.

Further embodiments relate to a data carrier signal carrying the computer program according to the embodiments.

Further embodiments relate to a use of the apparatus according to the embodiments and/or the method according to the embodiments for performing measurements based on said THz radiation, wherein a nominal working distance between the apparatus and/or at least one component of the apparatus is greater than 4 centimeter (cm) in some example and in other examples, equal to or greater than 10 cm, wherein said measurements are preferably based on reflection of said THz radiation at and/or transmission of said THz radiation through at least one measuring object, wherein said measurements preferably comprise determining layer thicknesses of a plurality of layers arranged on a surface of a body, wherein preferably said measurements comprise determining layer thicknesses of at least one coating layer, preferably a wet coating layer such as e.g. a wet or not yet fully dried paint layer.

BRIEF DESCRIPTION OF THE DRAWINGS

Further features, aspects and advantages of the embodiments are given in the following detailed description with reference to the drawings in which:

FIG. 3 to FIG. 9 each schematically depict a simplified block diagram of an apparatus according to further embodiments in partial cross-section.

DETAILED DESCRIPTION

Figure 1:
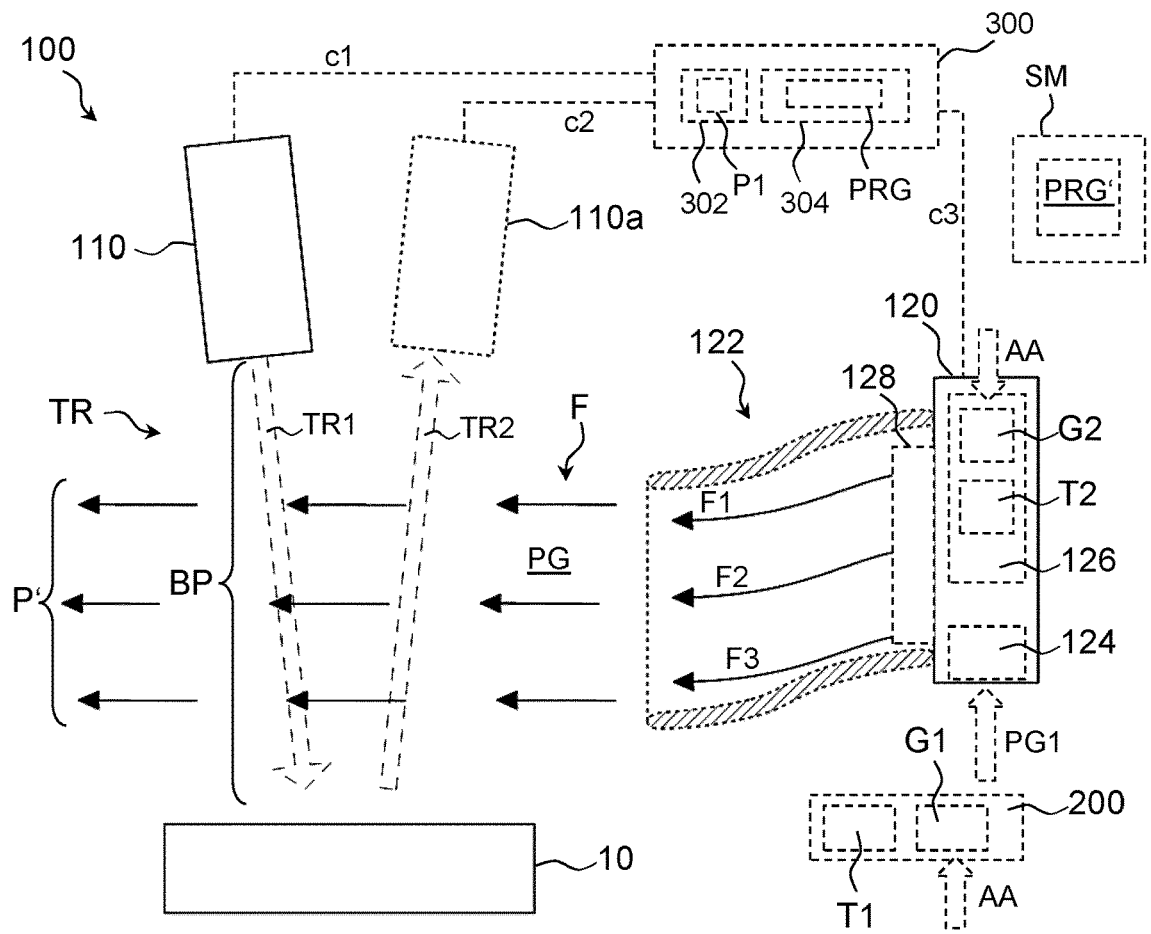
FIG. 1 schematically depicts a simplified block diagram of an apparatus according to embodiments.

FIG. 1 schematically depicts a simplified block diagram of an apparatus 100 according to embodiments. The apparatus 100 comprises at least one (presently exemplarily two) THz device(s) 110, 110a configured to transmit and/or receive THz radiation TR, e.g. to a measuring object 10. The apparatus 100 is configured to provide a flow F of protective gas PG in at least one portion P' of a beam path BP of said THz radiation TR. This advantageously enables to control the local environmental conditions that may affect propagation of said THz radiation TR thus enabling an increased precision for measurements using said THz radiation. Particularly, the flow F of protective gas PG enables to provide a local protective environment e.g. avoiding undesired absorption of THz radiation by water molecules as occurring with conventional systems.

According to further embodiments, said at least one THz device comprises at least one of: a) a THz transmitter 110 configured to transmit THz radiation TR1, b) a THz receiver 110a configured to receive THz radiation TR2, c) a THz transceiver (not shown) configured to transmit and to receive THz radiation TR. According to further embodiments, more than one THz transmitter 110 and/or more than one THz receiver 110a and/or more than one THz transceiver (not shown) may also be provided. Presently, the exemplary configuration of FIG. 1 comprises the THz transmitter 110 transmitting first THz radiation TR1 to said measuring object 10 and the THz receiver 110a receiving second THz radiation TR2, which e.g. corresponds to a portion of said first THz radiation TR1 that has been reflected by (a surface of) said measuring object 10.

According to further embodiments, said THz radiation TR comprises at least one frequency component in the range of 0.3 THz and 100 THz, preferably in the range of 0.5 THz and 10 THz, more preferably in the range of 3.0 THz to 10 THz. According to further embodiments, said THz radiation TR may comprise one or more THz pulses.

According to further embodiments, said protective gas PG comprises, or preferably is, at least one of: a) dry air, b) dry gas, c) dry gas mixture.

According to further embodiments, said protective gas PG comprises at least one gas which does not comprise an absorption line in a frequency range of said THz radiation TR.

According to further embodiments, said protective gas PG effects an attenuation of said THz radiation TR along said beam path BP of 0.1 dB or less, preferably for any frequency of said THz radiation TR.

According to further embodiments, said protective gas PG, e.g. dry air, comprises a dew-point temperature of $-20$ degrees Celsius (° C.) or less, preferably of $-30°$ C. or less, further preferably of $-40°$ C. or less.

According to further embodiments, said apparatus 100 further comprises at least one protective gas supply device 120 configured to provide said flow F of protective gas PG.

According to further embodiments, said apparatus 100 further comprises at least one pressure controller 128 for influencing, particularly controlling, a pressure of said flow F of protective gas PG. According to further embodiments, said influencing, particularly controlling, said pressure of said flow F of protective gas PG may comprise an open-loop or a closed-loop control. According to further embodiments, reference measurements using said THz radiation TR, TR2, may be made, and at least one parameter P1 characterizing fluid flow properties of a region of said beam path BP of said THz radiation TR may be determined, e.g. by a control device 300 which is explained in detail further below. As an example, under control c1 of the control device 300, the THz transmitter 110 may transmit first THz radiation TR1 to said measuring object 10, and the THz receiver 110a may receive the reflected portion TR2, based on which said control device 300 may determine said at least one parameter P1, cf. the data link c2. Based on said at least one parameter P1, said control device 300 may control an operation of the protective gas supply device 120, cf. the data link c3, e.g. to influence (increase or decrease or maintain) a pressure of said flow F of protective gas PG, whereby a closed-loop control as mentioned above is enabled. This way, the pressure of said flow F of protective gas PG may be optimized regarding a precision of said THz measurements, e.g. attaining a laminar or even homogenous flow F of said protective gas in at least a portion of said beam path BP of said THz radiation TR. Preferably, the pressure of said flow of protective gas may be controlled such as to ensure a spatially and temporally constant flow velocity of said flow of protective gas in the region of the beam path BP. According to further embodiments, an open-loop control of said pressure of said flow F of protective gas PG is also possible.

According to further embodiments, said (optional) pressure controller 128 may also form part of the protective gas supply device 120 and/or may be connected in series thereto, e.g. to an output (as exemplarily depicted by FIG. 1, or, according to further embodiments, to an input) of said protective gas supply device 120.

According to further embodiments, said apparatus 100 may comprise at least one flow regulator for influencing, particularly controlling, a volume flow of said (flow F of) protective gas PG. In this regard, according to further embodiments, the details explained above with respect to the pressure controller 128 may be applied correspondingly to the flow regulator.

According to further embodiments, said apparatus 100 further comprises at least one nozzle 122, wherein preferably said at least one nozzle 122 is configured and/or arranged so as to direct said flow F of protective gas PG, or at least a portion of said flow F, to said at least one portion P' of said beam path BP of said THz radiation TR, wherein preferably said at least one nozzle 122 is a free jet nozzle 122. This enables to provide the region comprising said beam path BP of said THz radiation TR with a precisely controllable flow F of protective gas PG. According to further embodiments, said flow F may comprise or be a laminar flow, preferably a homogenous flow. According to further embodiments, said at least one nozzle 122 may form part of said at least one protective gas supply device 120, preferably an integral part.

According to further embodiments, said apparatus 100 further comprises an inlet port 124 for receiving protective gas PG1 from an external supply 200. According to further embodiments, said inlet port 124 may e.g. form part of said at least one protective gas supply device 120.

According to further embodiments, said apparatus 100 further comprises a, preferably local, supply 126 for said protective gas PG, wherein said, preferably local, supply 126 is preferably attached to and/or integrated into at least one other component of said apparatus 100. According to further embodiments, said, preferably local, supply 126 may form part of said at least one protective gas supply device 120.

According to further embodiments, said external supply 200 and/or said, preferably local, supply 126 comprises at least one of: a) a protective gas tank T1, T2 for at least temporarily storing said protective gas, b) a protective gas generator G1, G2 configured to generate said protective gas, wherein preferably said protective gas generator G1, G2 is configured to receive atmospheric air AA and to convert said atmospheric air AA into said protective gas PG1, preferably into dry air.

According to further embodiments, said apparatus 100 is configured to provide one or more gas jets F1, F2, F3 of said protective gas PG, wherein preferably said one or more gas jets contribute to or constitute said flow F. According to further embodiments, said at least one nozzle 122 may be provided, wherein said at least one nozzle 122 may be configured to provide said one or more gas jets of said protective gas PG.

According to further embodiments, said flow F and/or at least one of said gas jets comprises and/or is a free jet. This enables particularly large nominal working distances for said apparatus (e.g., between the apparatus and/or its THz device(s) 110, 110a and the measuring object 10), because the THz radiation TR may efficiently be "shielded" from atmospheric air AA (and/or other surrounding fluids that may affect a propagation of THz radiation) by said free jet(s) of protective gas PG. Particularly, this way, no housing or any other (solid) body or device for guiding said flow F and/or gas jets (apart from e.g. the optional nozzle 122) are required to be placed between the apparatus 100 and the measuring object 10 that interacts with said THz radiation TR. According to further embodiments, a potential core length of said free jet is equal to or larger than about 2 cm in some embodiments or 4 cm in other embodiments.

According to further embodiments, the apparatus 100 may comprise a control device 300, as mentioned above. Said control device 300 may e.g. at least temporarily control an operation of said apparatus 100 and/or of at least one component of said apparatus 100.

According to further embodiments, said control device 300 comprises at least one calculating unit 302 and at least one memory unit 304 associated with (i.e., usably by) said at least one calculating unit 302 for at least temporarily storing a computer program PRG and/or data (not shown), wherein said computer program PRG is e.g. configured to at least temporarily control an operation of said apparatus 100, e.g. the execution of a method according to the embodiments, for example for controlling the operation of said THz device 110, 110a and/or the protective gas supply device 120 and/or one of its components.

According to further embodiments, said at least one calculating unit 302 may comprise at least one of the following elements: a microprocessor, a microcontroller, a digital signal processor (DSP), a programmable logic element (e.g., FPGA, field programmable gate array), an ASIC (application specific integrated circuit), hardware circuitry. According to further embodiments, any combination of two or more of these elements is also possible.

According to further embodiments, the memory unit 304 comprises at least one of the following elements: a volatile memory, particularly a random-access memory (RAM), a non-volatile memory, particularly a Flash-EEPROM. Preferably, said computer program PRG is at least temporarily stored in said non-volatile memory.

According to further embodiments, an optional computer-readable storage medium SM comprising instructions, e.g. in the form of a further computer program PRG', may be provided, wherein said further computer program PRG', when executed by a computer, i.e. by the calculating unit 302, may cause the computer 302 to carry out the method according to the embodiments or at least one step thereof. As an example, said storage medium SM may comprise or represent a digital storage medium such as a semiconductor memory device (e.g., solid state drive, SSD) and/or a magnetic storage medium such as a disk or hard disk drive (HDD) and/or an optical storage medium such as a compact disc (CD) or DVD (digital versatile disc) or the like.

According to further embodiments, the control device 300 may comprise one or more interfaces (not shown) for a, preferably bidirectional, data exchange with other components 110, 110a, 120, e.g. to control an operation of the THz device(s) 110, 110a and/or the protective gas supply device 120, e.g. a pressure controller 128 associated with and/or integrated into said protective gas supply device 120.

Figure 2:
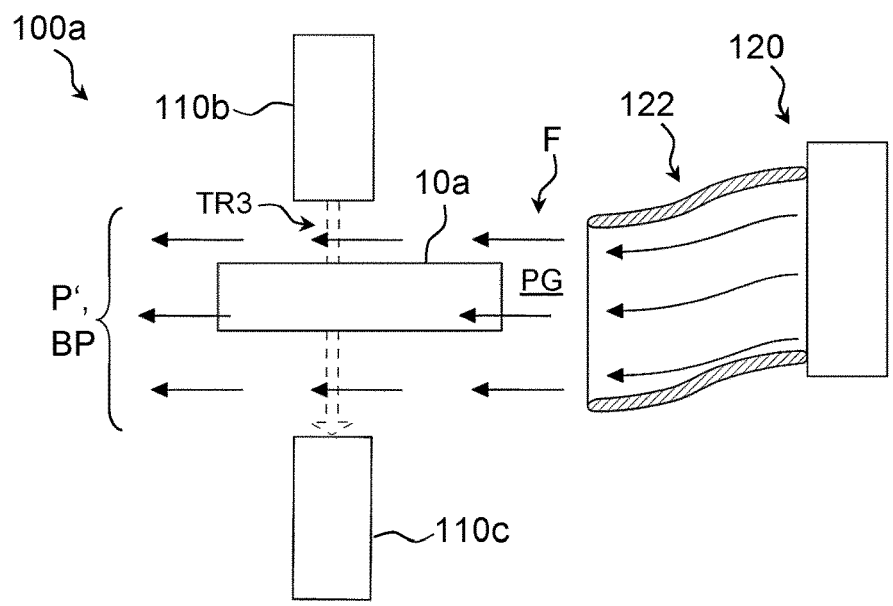
FIG. 2 schematically depicts a simplified block diagram of an apparatus according to further embodiments in partial cross-section.

FIG. 2 schematically depicts a simplified block diagram of an apparatus 100a according to further embodiments. In contrast to the configuration 100 of FIG. 1, which enables THz measurements based on a reflection of said THz radiation TR at a measuring object 10, the apparatus 100a of FIG. 2 enables THz measurements based on a transmission of said THz radiation through a measuring object 10a. A THz transmitter 110b transmits THz radiation TR3 towards said measuring object 10a, and a portion of said THz radiation TR3 which has been transmitted through said measuring object 10a is received by a THz receiver 110c. Similar to FIG. 1, a flow F of protective gas PG such as e.g. dry air is provided to at least a portion P' of the beam path BP of said THZ radiation TR3, wherein said protective gas supply device 120 of FIG. 2 may have a configuration identical to or similar to said protective gas supply device 120 of FIG. 1.

According to further embodiments, cf. the apparatus 100c of FIG. 3, said at least one nozzle 122 is arranged parallel with respect to said beam path BP of said THz radiation TR or a reference axis of said at least one THz device 110, 110a. In other words, according to further embodiments, a reference axis of said nozzle 122 along which the protective gas PG is output by said nozzle 122 may be parallel with respect to said beam path BP of said THz radiation TR or a reference axis (e.g., "optical" axis) of said at least one THz device 110, 110a.

According to further embodiments, also cf. FIG. 3, said at least one nozzle 122 is arranged coaxially with respect to said beam path BP of said THz radiation TR or a reference axis of said at least one THz device, preferably such that said nozzle 122 coaxially surrounds said beam path BP (or a virtual line extending said beam path BP) of said THz radiation and/or (substantially) coaxially surrounds at least one THz device 110, 110a. This enables to precisely "embed" said THz radiation TR in the flow F of protective gas PG as provided by said at least one nozzle 122, thus further reducing adverse effects on said THz radiation TR due to undesired absorption by a surrounding fluid (e.g., atmospheric air) and/or inhomogeneities of a flow velocity and/or a turbulent flow, e.g. in radially outer regions of said flow F of protective gas PG, thus further increasing precision.

According to further embodiments, said at least one nozzle 122 (e.g., a reference axis of said at least one nozzle) is arranged at an acute angle with respect to said beam path BP of said THz radiation TR or a reference axis of said at least one THz device, wherein preferably said acute angle ranges between 0 degrees and 30 degrees, preferably between 0 and 20 degrees. According to further embodiments, the nozzle 122 and/or said flow F provided thereby may also comprise another angle with said THz beam path BP, may e.g. be substantially perpendicular to said beam path, as exemplarily depicted by FIG. 1.

According to further embodiments, said flow F (FIG. 3) and/or at least one of said gas jets comprises a direction a) parallel to said beam path BP of said THz radiation TR (e.g., besides said beam path of said THz radiation or axially surrounding said beam path of said THz radiation) or b) at least substantially parallel to said beam path of said THz radiation, e.g. including a nonvanishing acute angle with said beam path of said THz radiation, wherein said nonvanishing acute angle is preferably less than 20 degrees, more preferably less than 10 degrees, cf. FIG. 3. Note that in the exemplary configuration of FIG. 3, the nozzle 122 and hence also the flow F provided thereby is not ideally parallel or coaxial to the beam path BP, as the individual THz devices 110, 110a are not aligned in parallel with the vertical of FIG. 3, corresponding to a reference axis of the nozzle 122 of FIG. 3. An ideal coaxial alignment in this sense is exemplarily depicted e.g. by FIG. 5 explained further below.

According to further embodiments, cf. FIG. 3, a nominal working distance dw between said at least one THz device 110, 110a and a measuring object 10 interacting with said THz radiation TR transmitted from and/or received by said at least one THz device 110, 110a is equal to or greater than 4 centimeter (cm) in some embodiments and equal to or greater than 10 cm in some embodiments. Advantageously, no device for guiding a flow F of said protective gas PG or any other device is required to be arranged between said apparatus 100c and said measuring object 10a, as the flow F of protective gas PG, preferably comprising one or more free jets, is sufficient for establishing a controlled local atmosphere of protective gas PG in the region of the beam path BP of the THz radiation TR. This facilitates handling, as e.g. no housing or the like is required between the apparatus 100c and the measuring object, so that especially also measuring objects comprising wet or drying coatings such as paint layers and the like can flexibly be handled, particularly without exerting a large impact pressure on such measuring objects that may occur when using a housing for the flow F between the apparatus 100c and the measuring object 10. Thus, embodiments are also particularly suited for performing THz radiation based measurements of measuring objects having sensitive surfaces such as e.g. painted and/or coated surfaces, wherein preferably said paint and/or coating is wet or at least not yet fully dried.

Moreover, when using the principle according to embodiments, and in contrast to conventional approaches, the measuring object 10 (FIG. 3) is not required to be placed within an own housing for THz measurements. Rather, the protective gas flow F, preferably free jet, according to embodiments may be considered to shield the THz beam path BP from adverse environmental effects such as humidity that may cause undesired absorption of said THz radiation TR which would reduce measurement precision. Hence, particularly undesired absorption interference caused by e.g. water vapor may be avoided.

FIG. 4 schematically depicts a simplified block diagram of an apparatus 100d according to further embodiments. While the nozzle 122 is still arranged such that its reference axis basically coincides with the beam path of the THz devices 110, 110a, the flow F is directed vertically upwards in FIG. 4, i.e. from the measuring object 10 towards the THz devices 110, 110a. In this configuration, too, a superior "shielding" of the THz beam path BP from environmental influences such as water vapor can be attained by the flow F of protective gas.

Figure 5:
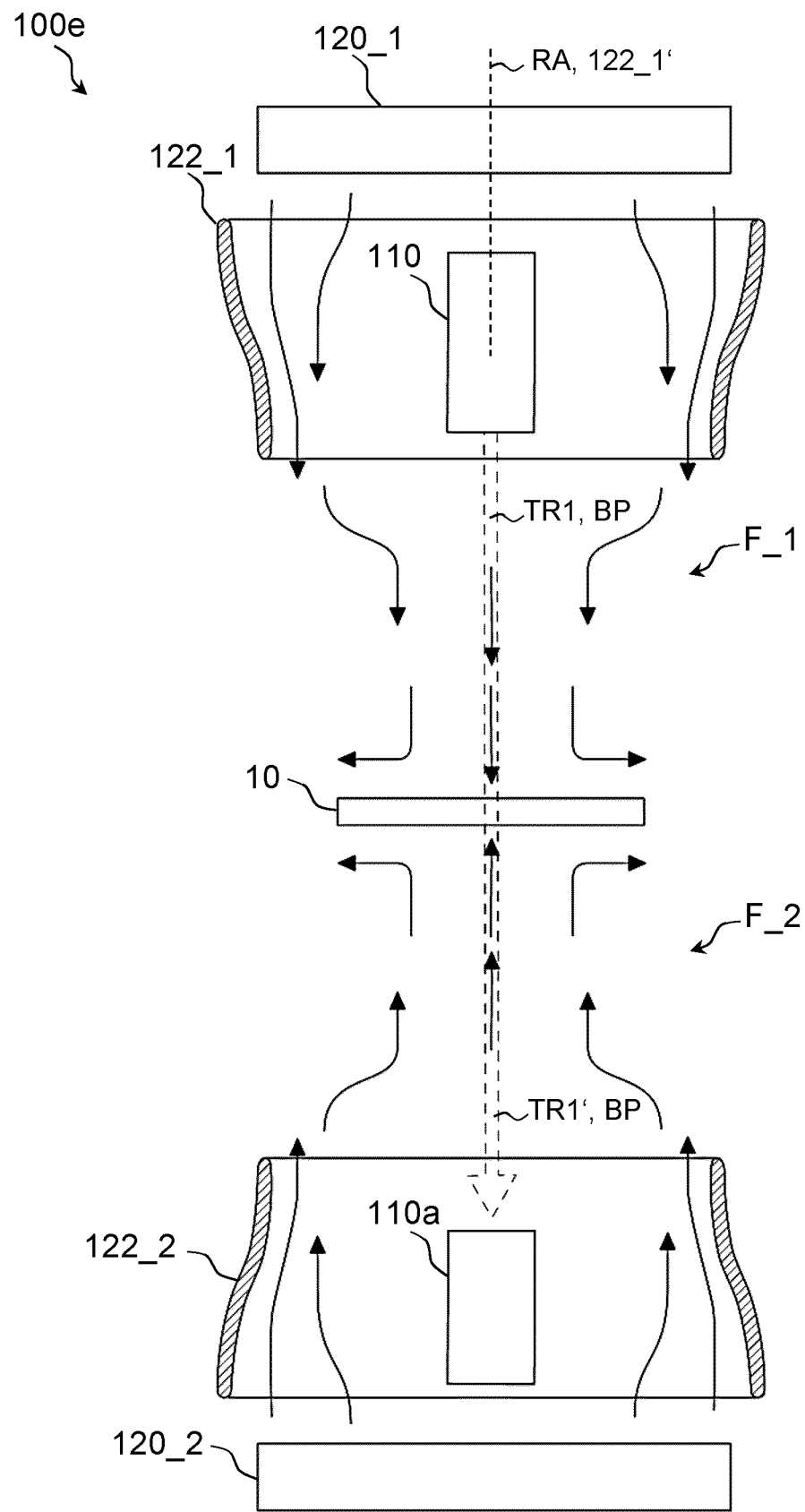

FIG. 5 schematically depicts a simplified block diagram of an apparatus 100e according to further embodiments. Two nozzles 122_1, 122_2 and respectively associated protective gas supply devices 120_1, 120_2 are provided, wherein said nozzles 122_1, 122_2 (and their reference axes 122_1') are coaxially arranged around a beam path BP which in FIG. 5 coincides with a reference axis RA of the THz devices 110, 110a, which are arranged in a transmission measurement setup with respect to the measuring object 10, the THz transmitter 110 transmitting THz radiation TR1, which is at least partly transmitted through said measuring object 10, and wherein a portion of the at least partly transmitted radiation TR1, cf. reference numeral TR1', is received by the THz receiver 110a. The first nozzle 122_1 provides a first flow F_1 of protective gas towards an (in FIG. 5) upper surface of the measuring object 10, and the second nozzle 122_2 provides an antiparallel second flow F_2 of protective gas towards a (in FIG. 5) lower surface of the measuring object 10, which flows F_1, F_2 are deflected in a region close to said respective upper and lower surface. Nevertheless, the beam path BP is efficiently protected by said flows F_1, F_2.

Figure 6:
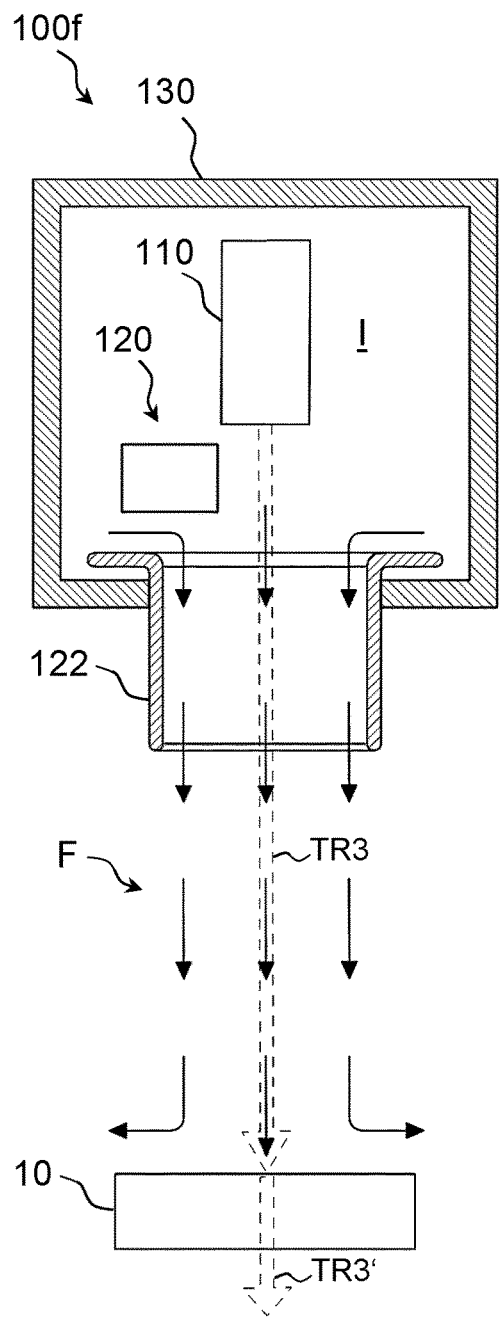

According to further embodiments, said apparatus 100f, cf. FIG. 6, comprises a housing 130, wherein said at least one THz device 110 is arranged in an interior I of said housing 130, wherein also at least one component of said (or the complete) protective gas supply device 120 is arranged within and/or constituted by said interior I of said housing 130. In the exemplary configuration of FIG. 6, a nozzle 122 is attached to the housing 130 and directs a flow F parallel to and/or coaxially around a beam path of the THz radiation TR3 emitted by said THz transmitter 110. Optionally, a portion TR3' of said THz radiation TR3 being transmitted through said measuring object 10 may be detected or received by at least one optional THz receiver which is not shown in FIG. 6.

Figure 7:
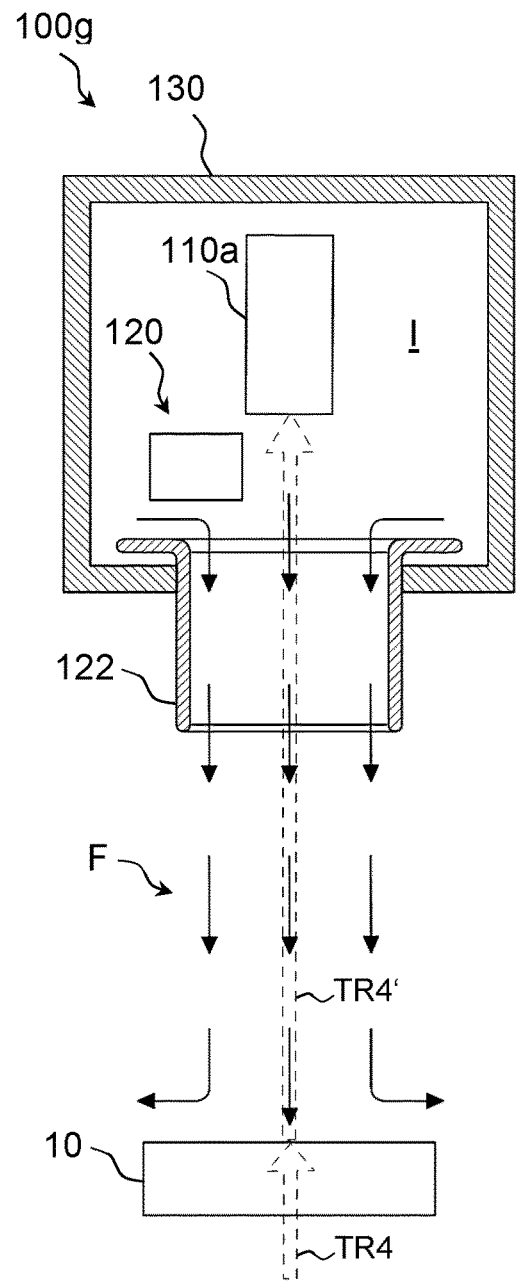

Similar to FIG. 6, FIG. 7 exemplarily depicts a THz radiation receive configuration with a THz receiver 110a and at least one component of said protective gas supply device 120 arranged in the interior I of a housing 130 of the apparatus 100g. THz radiation transmitted to a measuring object 10 of FIG. 7 may be provided by at least one THz transmitter not depicted by FIG. 7 and is referenced with reference sign TR4, whereas THz radiation transmitted through said measuring object 10, which may be received by said THz receiver 110a, is referenced with reference sign TR4'.

Figure 8:
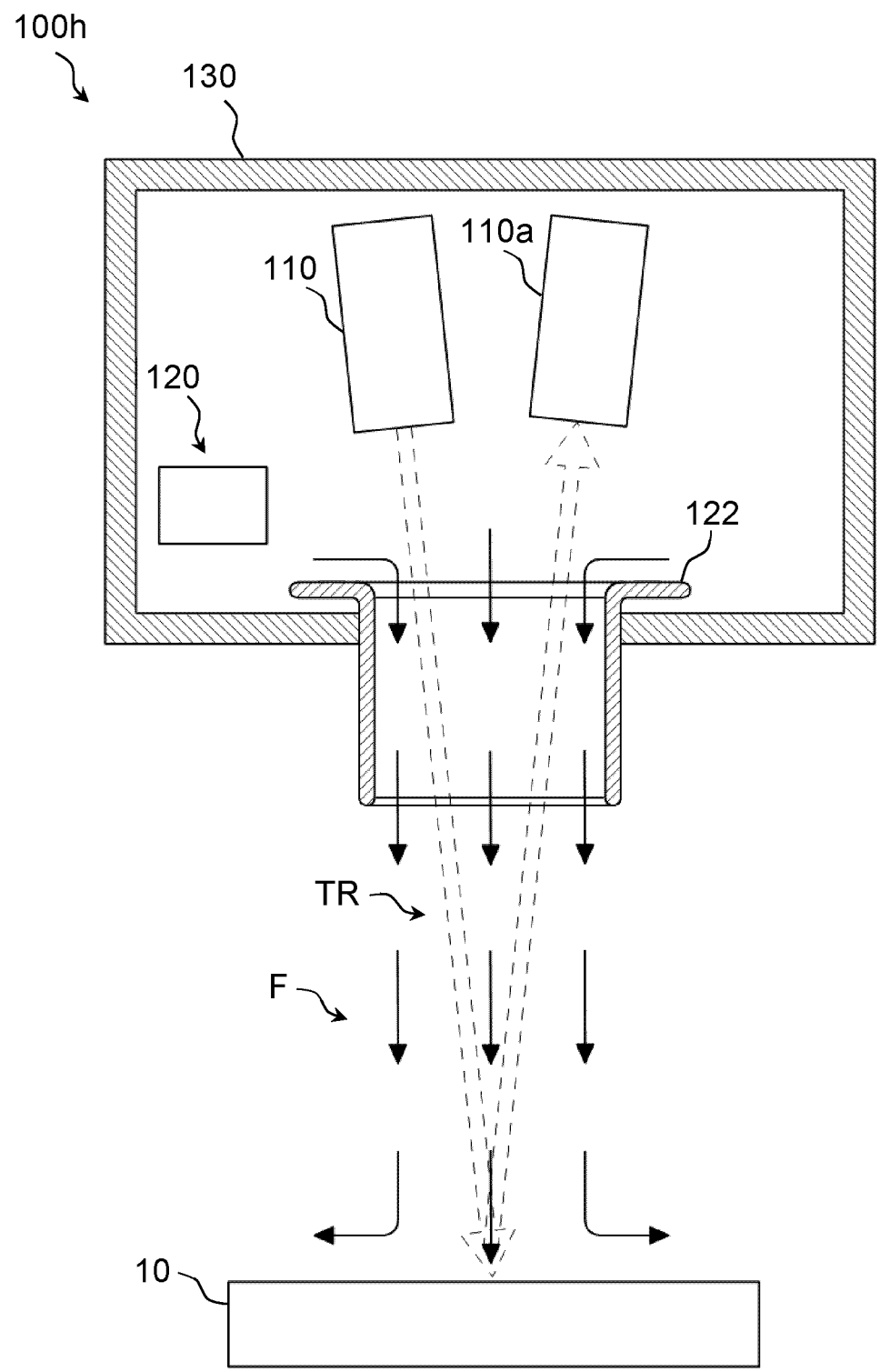

FIG. 8 schematically depicts an apparatus 100h according to further embodiments, which comprises a THz transmitter 110 and a THz receiver 110a arranged within a common housing 130, wherein at least one component of said protective gas supply device 120 may also be arranged within said common housing 130. Similar to FIG. 6, 7, the nozzle 122 of FIG. 8 is attached to the housing 130, and protective gas PG may be provided by device 120, e.g. from an interior of the housing 130, to an input end of the nozzle 122 for an output through an output end of the nozzle. The device 120 may e.g. be supplied with said protective gas by an external device 200 (FIG. 1) via an inlet port 124 (FIG. 1) that may be arranged at the housing 130 of FIG. 8, which, however is not depicted by FIG. 8 for reasons of clarity.

Figure 9:
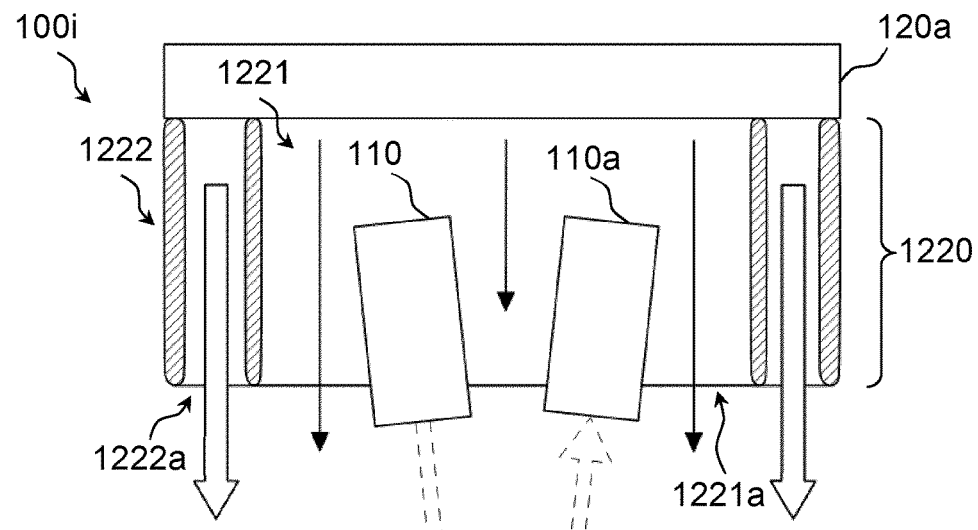

According to further embodiments, cf. FIG. 9, the apparatus 100i comprises a first nozzle 1221 (e.g., a free jet nozzle), which is configured to provide a first jet F41, preferably a free jet F41, of said protective gas PG, preferably to said at least one portion of said beam path BP of said THz radiation TR, wherein said apparatus 100i further comprises a second nozzle 1222, which is e.g. a ring nozzle arranged coaxially around said first nozzle 1221, wherein preferably said second nozzle 1222 is configured to provide a second jet F42, which preferably, particularly at least partly, coaxially surrounds said first jet F41, wherein preferably said second jet F42 is a sheath flow. Advantageously, said sheath flow F42 may extend radially outside of said first jet F41, e.g. free jet, provided by said first nozzle 1221, thus protecting said first jet F41, e.g. free jet, provided by said first nozzle 1221 from interaction with the surrounding medium, e.g. fluid, such as atmospheric air. Moreover, the sheath flow F42 prevents the creation of turbulent flows at a radially outer section of said first jet F41, e.g. free jet, provided by said first nozzle. Rather, at first, turbulent flows may occur at an interface between a radially outer side of said sheath flow F42 and the surrounding medium M, e.g. atmospheric air AA, which does not affect the THz beam path lying inside the first jet F41. Only after the sheath flow F42 is dissipated, e.g. due to creation of turbulent flows at the interface between the radially outer side of said sheath flow F42 and the surrounding medium M, turbulent flows may occur at a radially outer side of the inner first jet F41. This configuration enables to further increase the nominal working distance between said at least one THz device 110, 110a and a measuring object 10, as the radially outer sheath flow F42 effectively protects the radially inner first jet F41, e.g. free jet.

According to further embodiments, said second jet F42 (i.e., the sheath flow), may comprise ambient air AA and/or said protective gas PG. As the fluid of the (radially outer) second jet F42 usually does not (or at least not substantially) interact with the, preferably radially inner, THz beam path, the second jet F42 may comprise ambient air AA. However, for further increasing precision and a nominal working distance dw (FIG. 3), according to further embodiments, said protective gas PG may also be used for said second jet, i.e. the sheath flow F42.

According to further embodiments, both nozzles 1221, 1222 may be provided in form of an integrated nozzle device 1220, which may be supplied with protective gas PG by a corresponding common protective gas supply device 120a. According to further embodiments, at least one of the components 1221, 1222, 120a may also be arranged within or at a housing 130 (FIG. 8) of the apparatus 100i, which is not depicted by FIG. 9.

While exemplarily depicted together with two THz devices 110, 110a in FIG. 9, the principle of two, preferably coaxially aligned, nozzles 1221, 1222 may according to further embodiments also be applied to other apparatus having one THz device or more than two THz devices. Moreover, similar to the apparatus 100h of FIG. 8, the two nozzles 1221, 1222 of FIG. 9 may, according to further embodiments, also be arranged at a housing 130 (FIG. 8).

Figure 10:
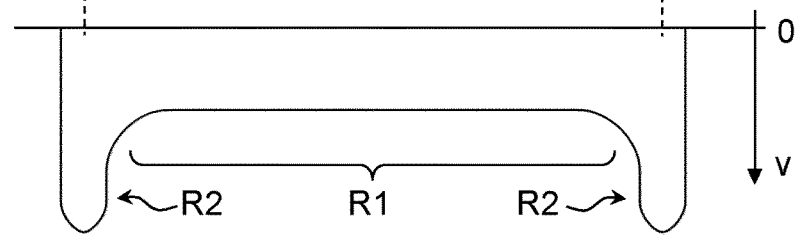
FIG. 10 schematically depicts a flow velocity according to further embodiments.

FIG. 10 schematically depicts a flow velocity v for the flows F41, F42 of the apparatus 100i according to FIG. 9. It can be seen that in a radially inner region R1 a constant flow velocity of said protective gas PG is provided, which is particularly beneficial for precise THz measurements as any spatial and/or temporal pressure differential within said THz beam path BP may affect the propagation of the THz radiation TR. In the radially outer regions R2 of the diagram according to FIG. 10, an increased flow velocity can be noticed, which is basically caused by the sheath stream F42.

Figure 11A:
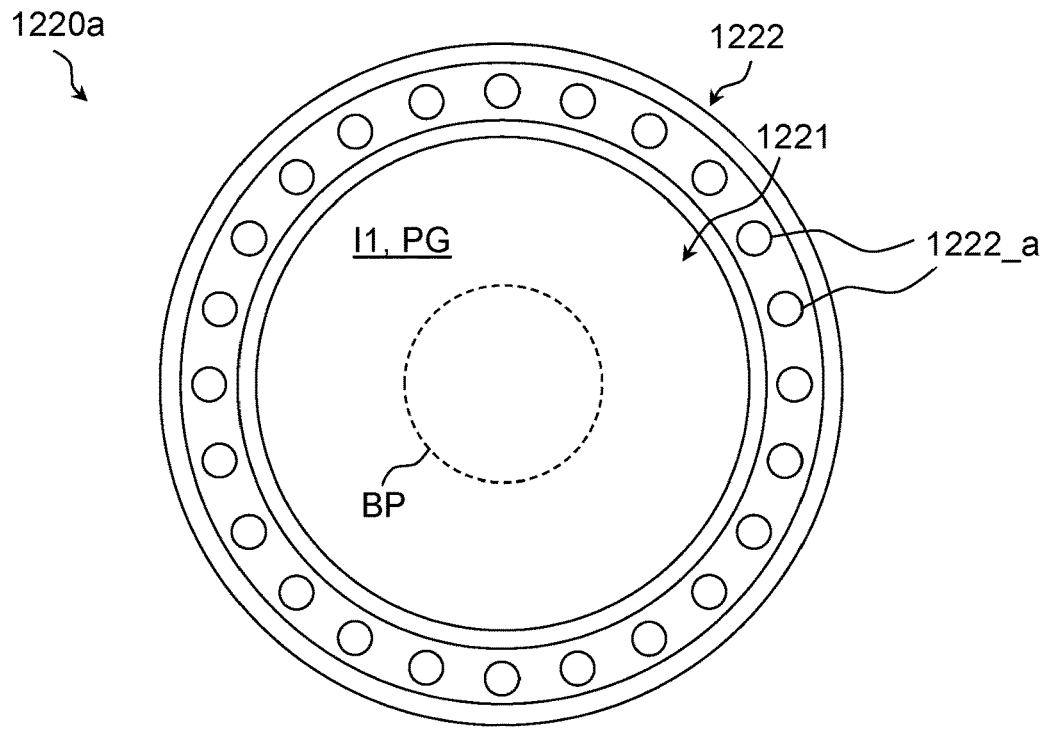
FIG. 11A schematically depicts a bottom view of a nozzle device according to further embodiments.

FIG. 11A schematically depicts a bottom view of a nozzle device 1220a according to further embodiments, comprising a first nozzle 1221 configured as a free jet nozzle and a second nozzle 1222 which radially surrounds said first nozzle 1221. In the embodiment 1220a of FIG. 11A, the second nozzle 1222 comprises a plurality of, preferably regularly spaced, circumferentially arranged nozzle openings only two of which are commonly denoted with reference sign 1222_a in FIG. 11A. This way, a free jet of protective gas PG may be provided, with a flow direction perpendicular to the drawing plane of FIG. 11A, and comprising or surrounding the beam path BP of the THz radiation TR (FIG. 9), which is arranged in the interior I1 of the first nozzle 1221.

According to further embodiments, it is also possible to provide the first (inner) nozzle 1221—instead of a single, preferably circular, opening, with a plurality of either equally spaced and/or regularly arranged and/or stochastically distributed individual nozzle openings to provide said flow F, similar to the nozzle openings 1222_a.

Figure 11B:
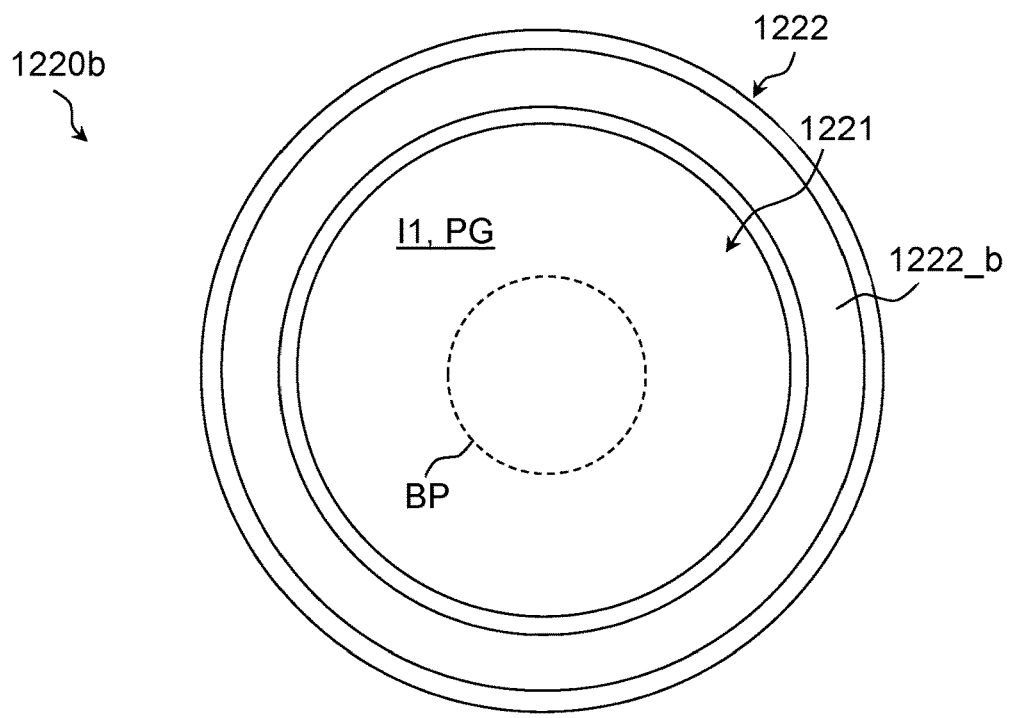
FIG. 11B schematically depicts a bottom view of a nozzle device according to further embodiments.

FIG. 11B schematically depicts a bottom view of a nozzle device 1220b according to further embodiments, which is similar to the nozzle device 1220a of FIG. 11A, wherein, however, the second nozzle 1222 is designed as a ring nozzle having a single annular passage 1222_b for providing said sheath flow F42 (FIG. 9).

According to further embodiments, each nozzle 1221, 1222 may comprise an individual inlet port (not shown) for receiving protective gas PG and/or ambient air or the like, wherein especially a radial velocity distribution of said flow(s) generated by said nozzles 1221, 1222 may flexibly be controlled.

Figure 12:
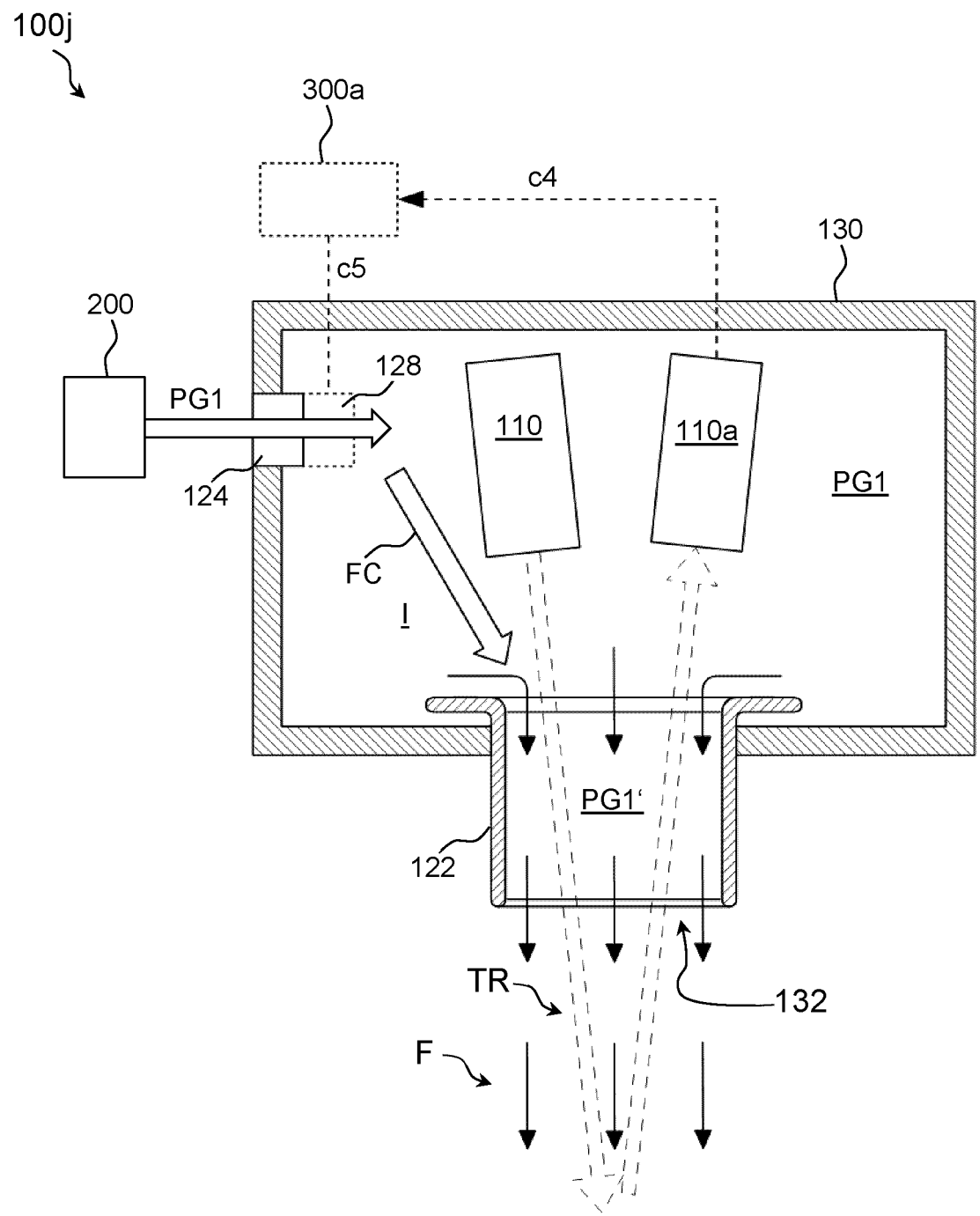
FIG. 12 to FIG. 14 each schematically depict a simplified block diagram of an apparatus according to further embodiments in partial cross-section.

According to further embodiments, cf. the apparatus 100j of FIG. 12, an inlet port 124 for protective gas PG1 from an external source 200 is arranged at and/or integrated into said housing 130, wherein said at least one nozzle 122 is arranged at and/or integrated into said housing 130, and wherein a fluid communication FV between said inlet port 124 and said at least one nozzle 122 is enabled via an interior I of the housing 130, cf. the block arrow FC which symbolically indicates said fluid communication. In other words, at least a part of the housing 130 of the apparatus 100i operates as a conduit for guiding said protective gas PG1 from the inlet port 124, optionally via an optional pressure controller 128, to said at least one nozzle 122. This has the further advantage that said one or more THz devices 110, 110a, which are arranged within said housing 130, are also at least partly surrounded with said protective gas PG1. The optional pressure controller 128 may e.g. be controlled, cf. the data connection c5 from a control device 300a, e.g. depending on a received THz signal c4.

According to further embodiments (FIG. 12), said housing 130 comprises an opening 132 for passing through said THz radiation TR, wherein said at least one nozzle 122 forms said opening 132. In other words, according to some embodiments, said at least one nozzle 122 may comprise an opening 132 for providing said flow F of protective gas PG1' to e.g. the exterior of the housing 130, particularly to a region of said beam path of said THz radiation TR, wherein said opening 132 of said nozzle 122 at the same time operates as a window enabling said THz radiation TR to be transmitted from the interior I of the housing 130 to an exterior of the housing 130, e.g. towards a measuring object 10 (not shown in FIG. 12) and/or vice versa, e.g. to enable a THz receiver or transceiver arranged within said housing 130 to receive THz radiation from the exterior of the housing. In other words, according to some embodiments, said at least one nozzle 122 may comprise a first, fluidic, function to provide said flow F of protective gas PG, PG', and additionally a second function to operate as a window enabling transmission and/or reception of said THz radiation TR.

Figure 13:
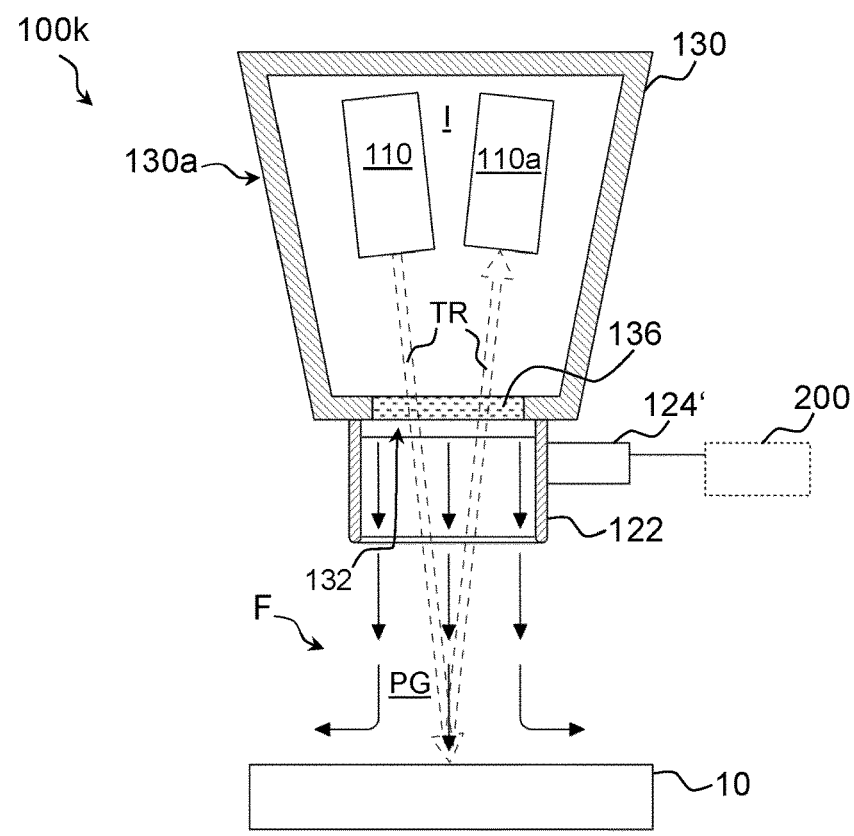

According to further embodiments, cf. the apparatus 100k of FIG. 13, a window 136 is provided in said opening 132, wherein said window 136 is preferably sealingly, particularly hermetically (gastight) sealingly, covering and/or closing said opening 132, wherein said window 136 is transparent (i.e., comprises a predetermined maximum attenuation) to said THz radiation TR in order not to impede THz measurements.

According to further embodiments, said at least one nozzle 122 may be provided around said opening 132 having said window 136, e.g. being attached to an outer surface 130a of the housing 130, and said at least one nozzle 122 may comprise an inlet port 124' for receiving the protective gas PG, e.g. from an external supply 200. Particularly, in these embodiments, the inlet port 124' is outside the housing 130 of the apparatus 100k (in which e.g. said at least one THz device 110, 110a may be arranged), so that the interior I of the housing 130 is not provided with "fresh" protective gas when said at least one nozzle 122 is supplied with said protective gas PG to provide said flow F of protective gas PG to the beam path of the THz radiation TR. According to further embodiments, the housing 130 may be hermetically sealed, and the interior I may be filled with protective gas prior to sealing, e.g. during manufacturing of said housing 130.

Figure 14:
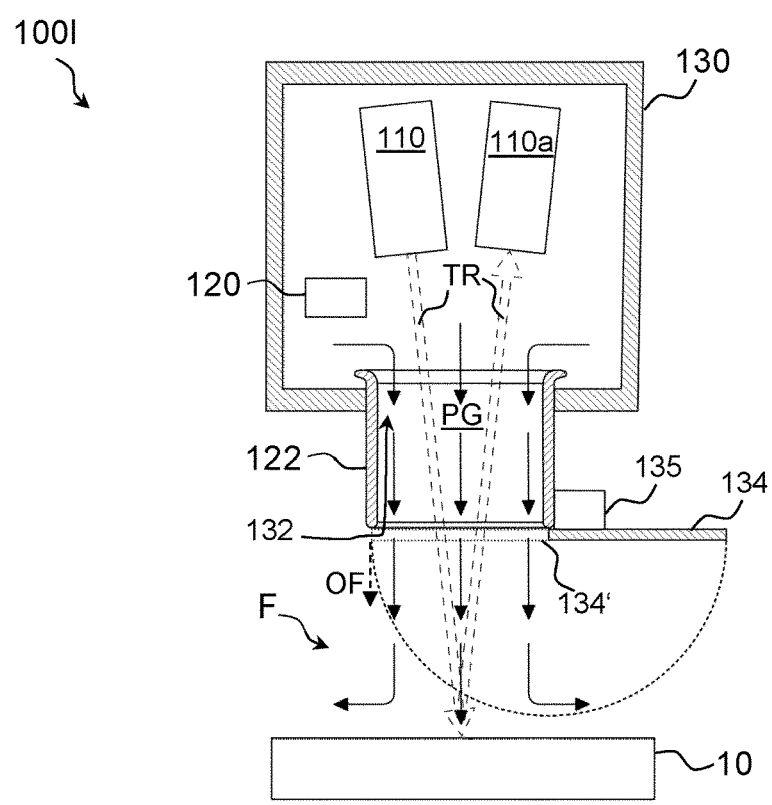

According to further embodiments, cf. the apparatus 100l of FIG. 14, said housing 130 comprises an opening 132 for passing through said THz radiation TR, wherein said at least one nozzle 122 is arranged in and/or at and/or around said opening 132.

According to further embodiments, said apparatus 100l comprises at least one lid 134 for, particularly selectively, opening and/or closing, preferably sealingly, particularly hermetically (gastight) sealingly, closing, said opening 132, wherein preferably said lid 134 is, particularly rotatably, attached to at least one of: the housing 130, the nozzle 122. Presently, in FIG. 14, the lid 134 is rotatably attached to said nozzle 122 and is exemplarily depicted in its opened state. A dotted rectangle 134' indicates the position of the lid 134 in its closed state.

According to further embodiments, the opening and/or closing of said lid 134 or the opening 132, respectively, may e.g. be performed depending on an operational state of said apparatus 100l. E.g., for an activated state, e.g. usable for performing measurements using said THz radiation TR, said lid 134 may—at least temporarily—be opened, and for a deactivated state, said lid 134 may be closed.

According to further embodiments, an actuator 135 (e.g., electromagnetic actuator) may be provided to drive movement of said lid 134, i.e. for opening said lid 134 and/or closing said lid 134. In the closed state, the lid 134 prevents e.g. particles to enter the interior I of the housing 130, while in the opened state, the lid 134 enables transmission and/or reception of THz radiation TR, as well as e.g. (optionally) a flow F of protective gas through said opening 132. If, according to further embodiments, a flow F of protective gas PG is provided through said opening 132 in the opened state of the lid 134, particles are prevented from entering the interior I of the housing 130 by means of said protective gas flow F.

According to further embodiments, said actuator 135 may comprise a spring or spring mechanism (not shown), preferably arranged and/or configured to exert a spring force ("closing force") on said lid 134 such that it is retained in its closed state, i.e. sealing the opening 132, by said closing force. Preferably, said spring or spring mechanism may be configured such that in the absence of said flow F of protective gas, said lid 134 remains in its closed state, sealing the opening 132, due to said closing force, wherein in the presence of said flow F of protective gas, an "opening" force OF may be provided by said flow F which is greater than said closing force, effecting the lid 134 to "automatically" (i.e., without human interaction) open once the flow F is present. In this opened state, THz measurements may be made, and once the flow F is deactivated, the lid will close again due to the closing force of the spring or spring mechanism 135.

Figure 15:
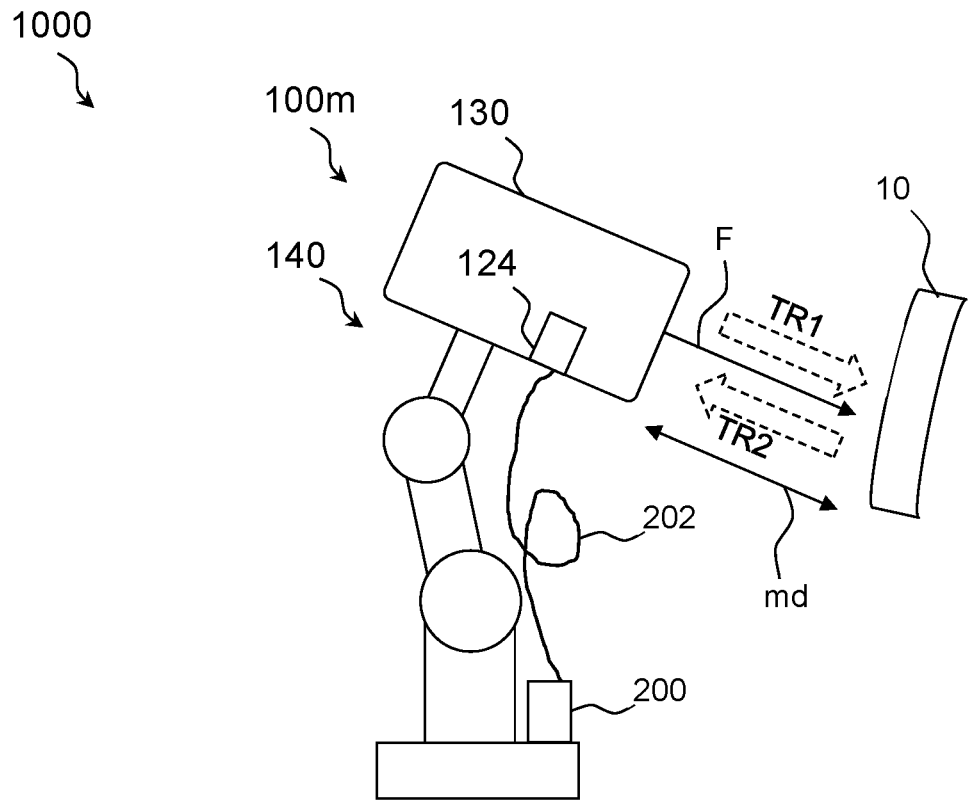
FIG. 15 schematically depicts a side view of an apparatus according to further embodiments.

According to further embodiments, said apparatus 100m, cf. FIG. 15, further comprises a positioning system 140, particularly a robot 140. As an example, according to further embodiments, the housing 130 may comprise one or more THz devices as explained above (not shown in FIG. 15), thus forming a THz measuring head 130, which THz measuring head 130 may be attached to said robot 140, so that THz measurements may efficiently be made for a wide variety of measuring objects 10, e.g. based on transmitted THz radiation TR1 and reflected THz radiation TR2 that has been reflected at said measuring object(s) 10. As an example, the apparatus 100m and/or the THz measuring head 130 may be used for THz measurements in in-line configurations of a manufacturing plant, e.g. for measuring a layer thickness of, preferably multiple, coating layers such as e.g. paint layers, on a body such as e.g. an automotive body part.

According to further embodiments, an external supply 200 of protective gas may be arranged at or close to the robot 140, and a fluid or gas line 202 may provide said protective gas to an inlet port 124 provided at the measuring head 130 (i.e., housing). Similar to at least one of the apparatus 100 to 100l explained above, the apparatus 100m of FIG. 15 may comprise at least one nozzle 122 (FIG. 1) (or a nozzle device 1220, cf. FIG. 9), to direct a flow F of protective gas, preferably in form of at least one free jet F, to a beam path of said THz radiation TR1, TR2.

Further embodiments relate to a measuring system 1000 comprising at least one apparatus 100m according to the embodiments and at least one measuring object 10, wherein preferably said apparatus 100m and said at least one measuring object 10 are spaced apart from each other by a measuring distance and of at least 2 centimeters, preferably of at least 5 centimeters, wherein preferably no body, preferably no solid body, (or any other material apart from said flow F of protective gas (and/or an optional sheath flow)) is arranged between said apparatus 100m and said measuring object 10.

Figure 17:
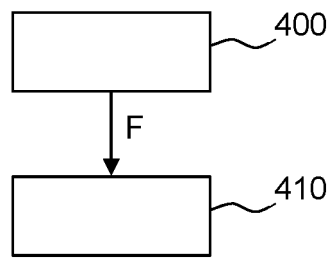
FIG. 17 schematically depicts a simplified flow-chart of a method according to further embodiments.

Further embodiments relate to a method of operating an apparatus comprising at least one THz device, wherein said at least one THz device is configured to transmit and/or receive THz radiation, wherein said apparatus provides a flow of protective gas in at least one portion of a beam path of said THz radiation. This is exemplarily depicted by the simplified flow chart of FIG. 17. In step 400, said apparatus 100 (FIG. 1) provides a flow F of protective gas PG in at least one portion P' of a beam path BP of said THz radiation TR. In step 410 (FIG. 17), the apparatus 100 performs measurements related to said measuring object 10 using said THz radiation TR. Advantageously, the steps 400, 410 are performed in a temporally at least partly overlapping fashion, i.e. simultaneously. This way, the THz radiation TR used for measurements is "protected" from undesired water (vapor) absorption effects by means of said flow F of protective gas PG.

Figure 16A:
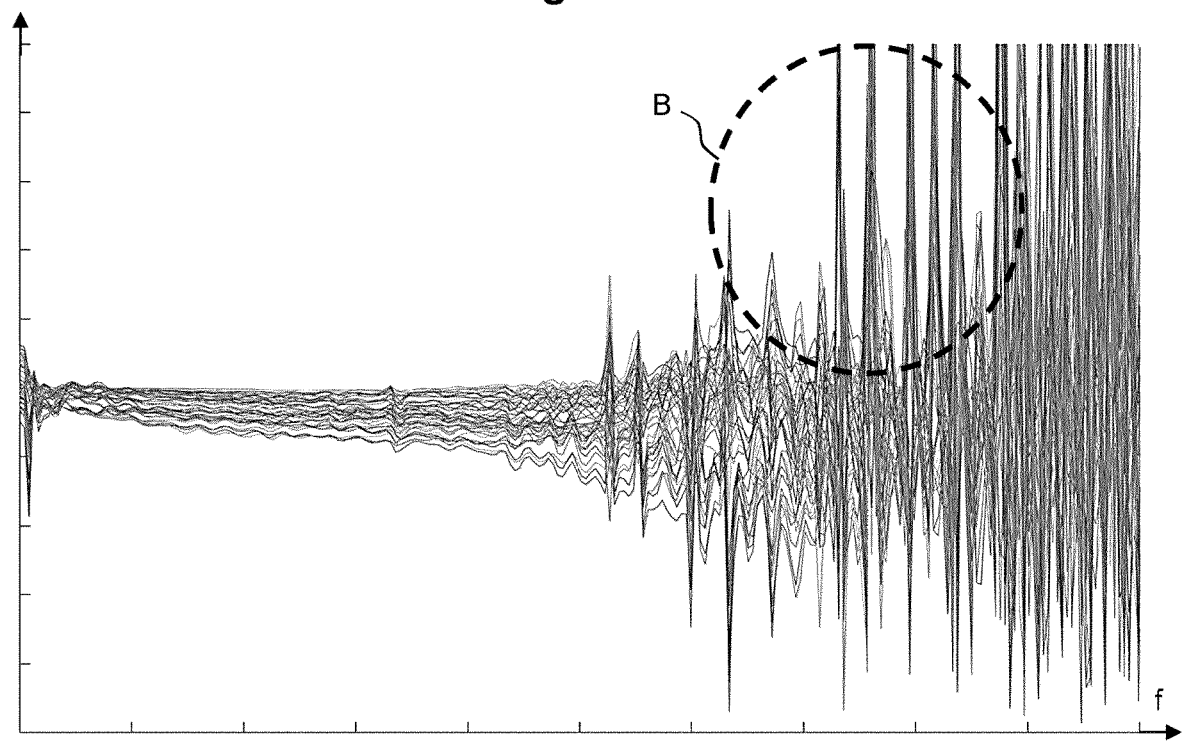
FIG. 16A schematically depicts an intensity of received THz radiation over frequency according to an example.

In this respect, FIG. 16A schematically depicts an intensity I1 of received THz radiation TR2 (FIG. 1) over frequency f according to an example, where no flow of protective gas PG has been provided for, especially during, the THz measurements. It can be seen that the THz measurements are severely affected by water absorption interference especially in the region B of FIG. 16A.

Figure 16B:
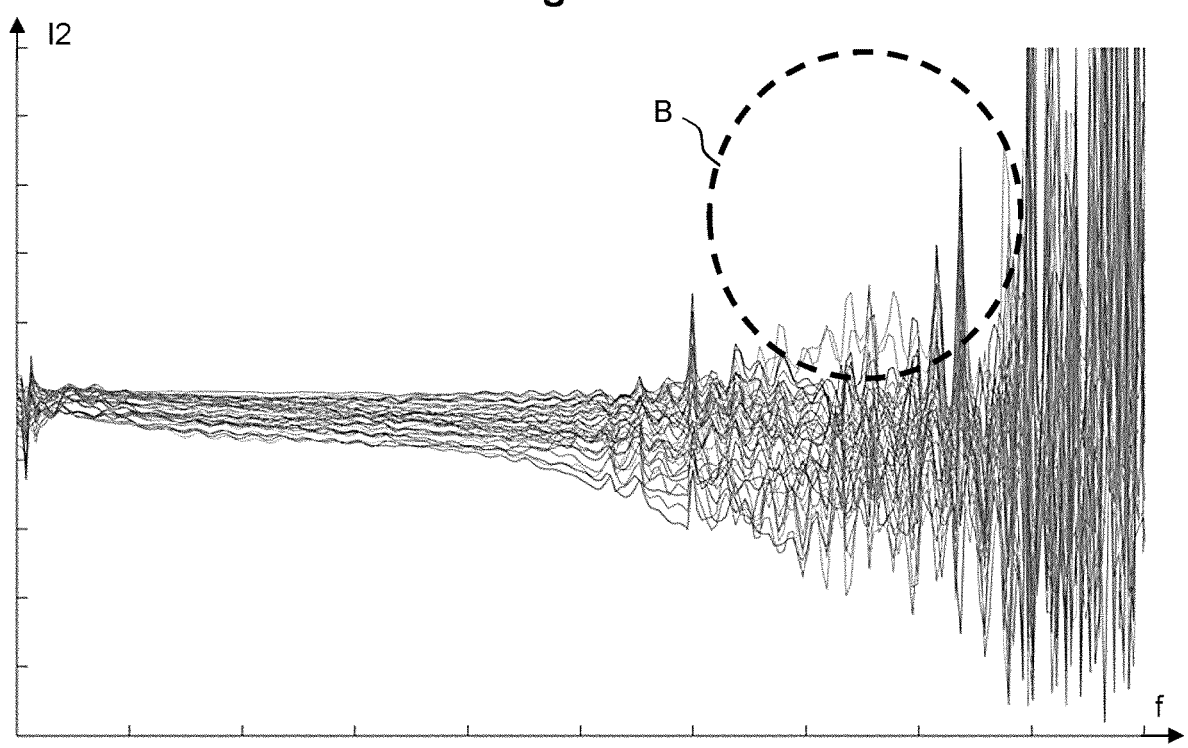
FIG. 16B schematically depicts an intensity of received THz radiation over frequency according to further embodiments.

Conversely, when performing THz measurements 410 (FIG. 17) using the principle according to the embodiments, i.e. providing a flow F (FIG. 1) of protective gas PG for, especially during, the THz measurements 410, the undesired noise and/or water absorption interference can be significantly reduced, cf. the region B of FIG. 16B. Note that the vertical intensity axis I2 of FIG. 16B has the same scaling and range as the vertical intensity axis I1 of FIG. 16A. This also applies to the frequency axes f of both diagrams.

According to further embodiments, said at least one nozzle 122 may also be designed as a de Laval nozzle. According to Applicant's analysis, these embodiments are particularly suitable for even larger working distances.

According to further embodiments, it is also possible to provide a fully turbulent flow of said protective gas to at least one portion of said beam path, wherein adverse effects of said turbulent flow on the THz radiation may cancel each other statistically.

According to further embodiments, the principle according to the embodiments may be used for a wide variety of measurements based on THz radiation, such as e.g. reflection-based and/or transmission-based measurements, e.g. (time-domain) reflectometry-based layer thickness measurements and the like, spectrographic measurements, THz radiation based imaging methods, and soon. Apart from reducing the undesired effects of water (vapor) absorption, at least some embodiments enable to further reduce noise of THz measurements that may be cause by fluctuations of a surrounding medium such as atmospheric air. Further embodiments enable to provide a controllable, preferably homogenous, distribution of (gas) pressure over time and space in the region of the THz beam path BP, thus further increasing precision and reliability of THz radiation based measurements.

The invention claimed is:

1. An apparatus comprising:
   at least one Terahertz (THz) device configured to transmit and/or receive THz radiation, said apparatus being configured to provide a flow of protective gas in at least one portion of a beam path of said THz radiation, wherein said flow of protective gas comprises a free jet,
   wherein said apparatus further comprises at least one nozzle configured to direct at least a portion of said flow of protective gas to said at least one portion of said beam path of said THz radiation,
   wherein said at least one nozzle is arranged a) parallel with respect to said beam path of said THz radiation or a reference axis of said at least one THz device and/or coaxially with respect to said beam path of said THz radiation or a reference axis of said at least one THz device; or b) at an acute angle with respect to said beam path of said THz radiation or a reference axis of said at least one THz device.

2. The apparatus according to claim 1, wherein said protective gas comprises at least one of: a) dry air; b) dry gas; c) dry gas mixture; or d) at least one gas which does not comprise an absorption line in a frequency range of said THz radiation.

3. The apparatus according to claim 1, wherein said protective gas comprises a dew-point temperature of −20 degrees Celsius or less.

4. The apparatus according to claim 1, wherein said protective gas effects an attenuation of said THz radiation along said beam path of 0.1 dB or less.

5. The apparatus according to claim 1, further comprising at least one of: a) at least one protective gas supply device configured to provide said flow of protective gas; or b) at least one pressure controller for influencing a pressure of said flow of protective gas.

6. The apparatus according to claim 1, further comprising an inlet port for receiving protective gas from an external supply.

7. The apparatus according to claim 6, wherein said apparatus comprises a housing, wherein said inlet port is arranged at and/or integrated into said housing.

8. The apparatus according to claim 7, further comprising:
   at least one nozzle configured to direct at least a portion of said flow of protective gas to said at least one portion of said beam path of said THz radiation, wherein the at least one nozzle is arranged at and/or integrated into said housing, and wherein a fluid communication between said inlet port and said at least one nozzle is enabled via an interior of the housing.

9. The apparatus according to claim 1, further comprising a supply for said protective gas.

10. The apparatus according to claim 9, wherein said supply comprises at least one of: a) a protective gas tank for at least temporarily storing said protective gas; or b) a protective gas generator configured to generate said protective gas.

11. The apparatus according to claim 1, wherein said apparatus is configured to provide one or more gas jets of said protective gas.

12. The apparatus according to claim 11, wherein at least one of said gas jets comprises and/or is a free jet.

13. The apparatus according to claim 1, wherein said flow of protective gas comprises a flow in a direction a) parallel to said beam path of said THz radiation or b) at least substantially parallel to said beam path of said THz radiation.

14. The apparatus according to claim 1, wherein a nominal working distance between said at least one THz device and a measuring object interacting with said THz radiation transmitted from and/or received by said at least one THz device is equal to or greater than 4 centimeter (cm).

15. The apparatus according to claim 1, wherein said apparatus comprises:
   a first nozzle configured to provide a first jet of said protective gas; and
   a second nozzle wherein the second nozzle is a ring nozzle arranged coaxially around said first nozzle.

16. The apparatus according to claim 15, wherein said second nozzle is configured to provide a second jet, wherein the second jet at least partly coaxially surrounds said first jet.

17. The apparatus according to claim 1, wherein said apparatus comprises:
   a housing, wherein said at least one THz device is arranged in an interior of said housing.

18. The apparatus according to claim 17, comprising:
   a supply for said protective gas, wherein at least one component of said protective gas supply is arranged within and/or constituted by said interior of said housing.

19. The apparatus according to claim 17, wherein said housing comprises an opening for passing through said THz radiation, and wherein at least one nozzle configured to direct at least a portion of said flow to said at least one portion of said beam path of said THz radiation a) is arranged in or around said opening, and/or b) forms said opening.

20. The apparatus according to claim 19, wherein said apparatus comprises at least one lid configured for opening and/or closing said opening.

21. The apparatus according to claim 20, wherein the at least one lid is configured for sealingly closing said opening.

22. The apparatus according to claim 20, wherein said lid is attached to at least one of: the housing or the nozzle.

23. The apparatus according to claim 19, wherein a window is provided in said opening, wherein said window is configured to sealingly close said opening, and wherein said window is transparent to said THz radiation.

24. The apparatus according to claim 1, further comprising a positioning system configured to position said apparatus at least a measuring distance from a measuring object, wherein a spatial region between said apparatus and said measuring object is exposed to the surroundings, and wherein no solid body is arranged between said apparatus and said measuring object.

25. The apparatus of claim 1, further comprising:
a positioning system configured to position said apparatus at least a measuring distance from a measuring object, wherein said measuring distance is at least 2 centimeters, wherein a spatial region between said apparatus and said measuring object is exposed to the surroundings, and wherein no solid body is arranged between said apparatus and said measuring object.

26. A method of operating an apparatus comprising at least one THz device, wherein said at least one THz device is configured to transmit and/or receive THz radiation, wherein said apparatus provides a flow of protective gas in at least one portion of a beam path of said THz radiation, wherein said flow comprises a free jet.

27. The method according to claim 26, wherein said apparatus performs measurements on a measuring object and further comprises at least one nozzle, wherein said at least one nozzle directs at least a portion of said flow of protective gas to said at least one portion of said beam path of said THz radiation, wherein a spatial region between said apparatus and said measuring object is exposed to surroundings, and wherein no solid body is arranged between said apparatus and said measuring object.

28. A method for performing measurements, comprising:
transmitting THz radiation along a beam path using at least one THz device;
providing a flow of protective gas to at least one portion of the beam path of the THz radiation using a protective gas flow device, wherein the flow of protective gas comprises a free jet of protective gas; and
positioning, using a positioning system, an apparatus that includes the THz device to a measuring distance (md) from a measuring object, wherein the measuring distance (md) is at least equal to or greater than 4 centimeters, and wherein no solid body is arranged between the apparatus and the measuring object.

29. The method of claim 28, wherein the measuring distance (md) is at least equal to or greater than 10 centimeters.

30. The method of claim 28, further comprising:
determining by at least a control device one or more measurements of the measuring object, wherein at least the control device determines the one or more measurements from at least a portion of the THZ radiation that is reflected from or transmitted through the at least one measuring object.

31. The method of claim 30, wherein determining by at least the control device the one or more measurements comprises:
determining a layer thicknesses of one or more layers arranged on a surface of the measuring object, wherein the one or more layers include: a) at least one paint layer; or b) at least one coating layer; or c) at least one paint layer and at least one coating layer.

32. The method of claim 30, wherein the at least one paint layer comprises at least one wet paint layer; or wherein the at least one coating layer comprises at least one wet coating layer.

* * * * *